United States Patent
Nilsen et al.

(10) Patent No.: US 12,234,092 B2
(45) Date of Patent: Feb. 25, 2025

(54) SYSTEM-DIRECTED SINGLE LINE PICK BATCHING

(71) Applicant: Staples, Inc., Framingham, MA (US)

(72) Inventors: Stephen Nilsen, Clayton, NC (US); Matthew Robert Douglas, Orlando, FL (US); Gregory Patrick Cox, Sleepy Hollow, NY (US); Paolo Gerli Amador, Framingham, MA (US); Daniel Jarvis, Orlando, FL (US); Amit Kalra, Acton, MA (US)

(73) Assignee: Staples, Inc., Framingham, MA (US)

( * ) Notice: Subject to any disclaimer, the term of this patent is extended or adjusted under 35 U.S.C. 154(b) by 839 days.

(21) Appl. No.: 17/390,681

(22) Filed: Jul. 30, 2021

(65) Prior Publication Data

US 2022/0033186 A1 Feb. 3, 2022

Related U.S. Application Data

(60) Provisional application No. 63/058,892, filed on Jul. 30, 2020.

(51) Int. Cl.
| | |
|---|---|
| B65G 1/137 | (2006.01) |
| G05D 1/00 | (2024.01) |
| G06K 7/10 | (2006.01) |
| G06Q 10/0631 | (2023.01) |
| G06Q 10/08 | (2024.01) |

(52) U.S. Cl.
CPC ......... *B65G 1/1373* (2013.01); *B65G 1/1371* (2013.01); *G05D 1/0088* (2013.01); *G05D 1/0212* (2013.01); *G06K 7/10445* (2013.01); *G06Q 10/06315* (2013.01); *G06Q 10/08* (2013.01); *G06K 7/10297* (2013.01); *G06K 2007/10504* (2013.01); *G06Q 2250/70* (2013.01)

(58) Field of Classification Search
CPC .. B65G 1/1373; B65G 1/1371; B65G 1/1375; B65G 2209/02; B65G 2209/06; G06K 7/10445; G06K 7/10297; G06K 2007/10504; G06Q 10/06315; G06Q 10/08; G06Q 2250/70
See application file for complete search history.

(56) References Cited

U.S. PATENT DOCUMENTS

| | | |
|---|---|---|
| 10,589,931 B2 | 3/2020 | Jarvis et al. |
| 10,803,420 B2 | 10/2020 | Jarvis et al. |
| 2017/0278047 A1* | 9/2017 | Welty ................ G05D 1/0011 |

(Continued)

*Primary Examiner* — Jacob S. Scott
*Assistant Examiner* — Erin Morris
(74) *Attorney, Agent, or Firm* — VLP Law Group, LLP; Michel Bohn

(57) ABSTRACT

A system-directed single line pick batching is described. In an example implementation, the system may receive data describing a set of orders including SKU identifiers associated with items in the orders, identify an eligible cart, and assign a location to a task queue of the cart based on the location being associated with a particular SKU identifier. In some instances, the location or SKU identifier may be determined based on an order with a certain quantity of different SKU identifiers. In some instances, the system may navigate the cart to the location and instruct the item to be picked from the location. In response to completion of the pick of the item, the system may navigate the cart to an end point.

20 Claims, 17 Drawing Sheets

(56) References Cited

U.S. PATENT DOCUMENTS

2019/0138978 A1\* 5/2019 Johnson ............. G06Q 10/0835
2019/0333006 A1\* 10/2019 Velten ................. G06Q 10/087
2020/0242544 A1\* 7/2020 Galluzzo ............... B25J 9/1692

\* cited by examiner

SYSTEM-DIRECTED SINGLE LINE PICK BATCHING

BACKGROUND

This application relates to inventory management and order fulfillment systems. For example, aspects of this application relate to automated guided vehicles and other computing devices used in order fulfillment.

Some current inventory management systems use drag-along carts on which human agents (pickers) place items they select (pick) to fulfill orders. However, the assignment, automation, and use of these systems lacks intelligence and is slow and inefficient. For instance, these systems do not balance workloads, do not separate orders based on items or locations, and fail to take a number of other factors into consideration.

Traditional inventory management systems do not coordinate mobile pickers with the movement of carts in a pick-to-cart system, particularly when mobile robots also are involved. For instance, these systems do not dynamically adjust the operations or coordination of pickers and carts.

These deficiencies lead to significant inefficiencies in resource utilization, imbalanced equipment workloads, and other problems.

SUMMARY

A storage fetching system can be configured to perform particular operations or actions by virtue of having software, firmware, hardware, or a combination of them installed on the system that, in operation, causes or cause the system to perform the actions. One general aspect of the system includes operations comprising: receiving data describing a set of orders, the set of orders including one or more items having one or more stock keeping unit (SKU) identifiers associated with the one or more items; identifying a first cart for batch picking; assigning a first location in a pick-to-cart area to a task queue of the first cart based on a first item having only a first SKU identifier being located at the first location and a first order of the set of orders including the first SKU identifier; navigating the first cart to the first location in a pick-to-cart area; instructing a picker to pick the first item having the first SKU identifier at the first location; receiving one or more confirmation inputs indicating completion of a pick of the first item having the first SKU identifier to the first cart; and navigating the first cart to an end point.

Some implementations may include one or more of the following features: receiving after dispatching the first cart, order data representing a second order, the second order including a second SKU identifier; determining a second location at which a second item having the second SKU identifier is located; determining that the second location is located after the first location on a path of the first cart; in response to the second location being located after the first location on the path of the first cart, assigning the second location to the task queue of the first cart and transmitting a second pick instruction to one or more client devices associated with the picker, the second pick instruction indicating a second quantity of the second item having the second SKU identifier; that receiving the set of orders includes receiving first order data representing an initial set of orders, the first order data indicating SKU identifiers included in the initial set of orders, and sorting the initial set of orders into the set of orders based on those orders having a single SKU identifier per order; receiving, by one or more processors, scan data from one or more client devices, the first cart being identified using the scan data; determining, by one or more processors, a current location of the first cart in a fulfillment center; and dispatching, by one or more processors, the first cart from the current location.

Some implementations may additionally or alternatively include one or more of the following features: that assigning the first location to the task queue of the first cart includes determining the first order from among the set of orders based on a quantity of different SKU identifiers in each of the set of orders, and determining the first location based on a location at which the first item having the first SKU identifier is stored in the pick-to-cart area, the first order being selected based on the first order having a single variety of SKU identifier; that navigating the first cart to the first location includes coupling an automated guided vehicle with the first cart, the automated guided vehicle having a drive unit adapted to propel the automated guided vehicle, a guidance system adapted to locate the automated guided vehicle in the pick-to-cart area, and a controller adapted to receive instructions and transport the first cart using the drive unit and the guidance system based on the instructions, the cart being adapted to hold a plurality of items, and providing, by the automated guided vehicle, motive force to the first cart to propel the first cart to the first location; and that receiving the one or more confirmation inputs includes receiving item scan data from one or more client devices, the item scan data identifying the first SKU identifier of the first item, and receiving cart scan data identifying the first cart from the one or more client devices.

Some implementations may additionally or alternatively include one or more of the following features: that instructing the picker to pick the first item having the first SKU identifier includes instructing the picker to pick a pick quantity of the first item, and determining the pick quantity based on orders assigned to the first cart; receiving a first user input requesting to split the pick quantity of the first item of the first item into multiple picks; receiving a second user input indicating a second quantity of the first item having the first SKU identifier for at least one of the multiple picks; that receiving the one or more confirmation inputs includes receiving a confirmation input after each of the multiple picks; and that determining a first quantity of the first item having the first SKU identifier in the first order, determining a second order of the set of orders that includes the first SKU identifier, determining a second quantity of the first item having the first SKU identifier in the second order, and determining the pick quantity of the first item having the first SKU identifier by summing the first quantity and the second quantity.

Some implementations may additionally or alternatively include one or more of the following features: receiving an input indicating that the first cart is full and, in response, transporting, by an automated guided vehicle, the first cart to a finalization station, the end point being at the finalization station; determining that the first cart is at a finalization station, the end point being at the finalization station; receiving item scan data, the item scan data identifying the first SKU identifier of the first item; determining the first order including the first SKU identifier based on the item scan data, the first cart having items with the first SKU identifier for multiple orders; and in response to determining the first order based on the item scan data, printing a carton shipping label for a carton into which the first item for the first order is placed.

Some implementations may additionally or alternatively include one or more of the following features: identifying a second cart for batch picking; assigning a second location in the pick to cart area to a second task queue of the second cart based on the second location based on the second cart being located nearer to the second location in the pick-to-cart area than the first cart; assigning a second location in the pick-to-cart area to the task queue of the first cart; and, in response to two locations being assigned to the first cart, dispatching an automated guided vehicle coupled with the first cart to the first location in the pick to cart area.

Other implementations of one or more of these aspects include corresponding systems, apparatus, computer processors, computer memories, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
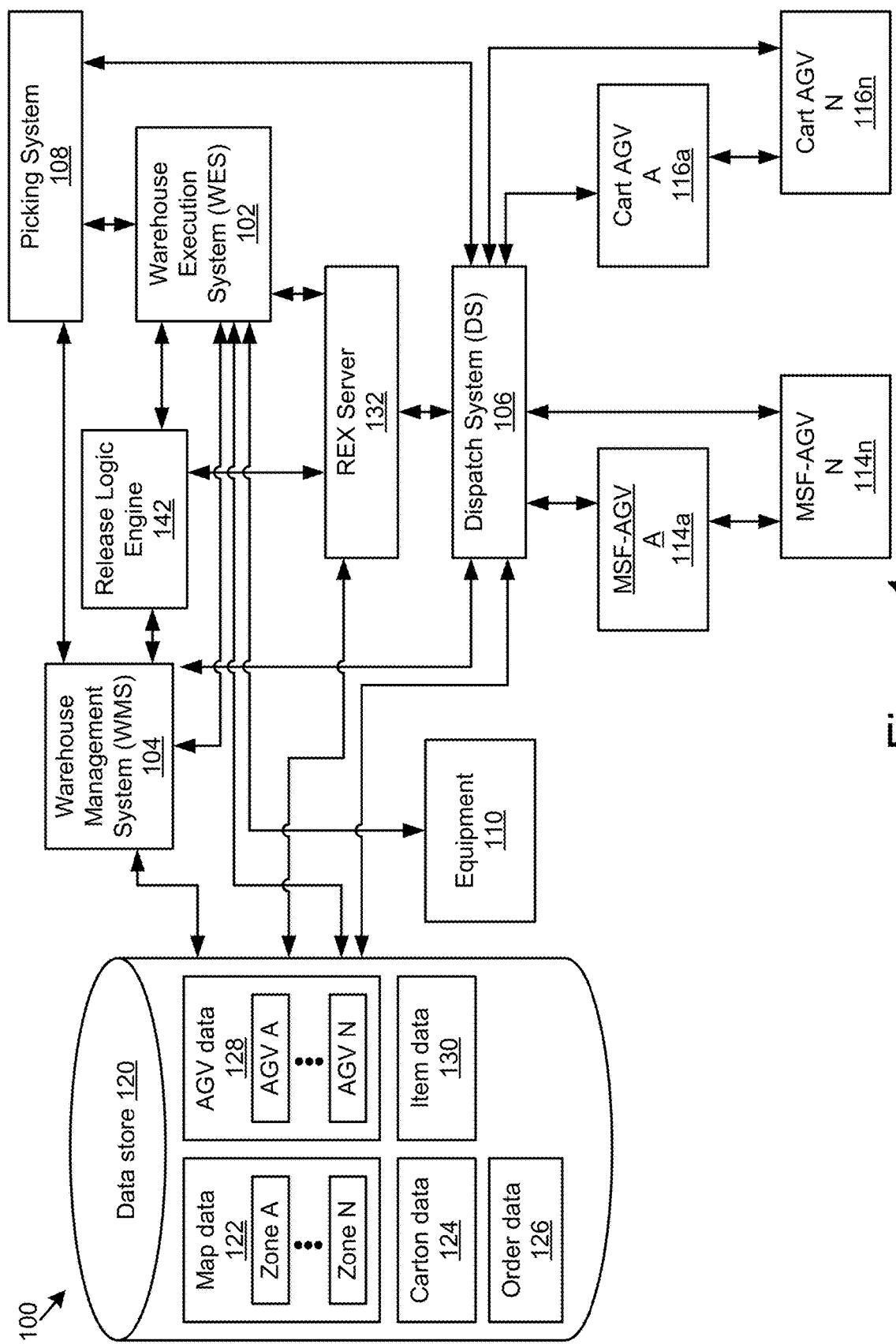
FIG. 1 is a block diagram of an example system and data communication flow for system-directed single line pick batching.

Among other benefits, the technology provides robotic devices, systems, methods, and other aspects that can more efficiently process goods (e.g., items in a distribution facility) based on demand, available capacity, and other dynamic factors in the resources and equipment of the distribution facility. Further, the technology can reduce the number of irrelevant items carried simultaneously with relevant items and provide automated guided vehicle(s) (AGV(s)) that are configured to efficiently carry items.

Implementations of the technology described herein include example AGVs that carry items. In some implementations, a cart AGV 116 may autonomously transport a cart onto which items or batches of items may be picked, so that a picker may remove individual items from the cart and place them into a carton (e.g., at a cartless, goods-to-person, pick-cell, or finalization station).

Features of the technology described herein can be integrated into any logistics system, dispatch system 106, warehouse execution system 102, warehouse management system 104, a robot execution server 132, etc., to coordinate the provision of to-be-picked items in a fulfillment center. This technology beneficially improves productivity and throughput, increases asset utilization, and lowers cycle time and labor costs. These benefits, in turn, lead to shorter delivery times and result in significant value.

The technology described herein allows more efficient preparation of cartons in a fulfillment center. For example, an order to be fulfilled may be split into one or more orders or cartons that may be shipped to a customer. Each carton may include one or more items, which may be represented by stock keeping units (SKUs) or SKU identifiers. For instance, a SKU may represent an item of a particular type (e.g., brand X paper or brand Y package of pens). In some implementations, a cart carrying cartons or shipping boxes is transported through a pick-to-cart area 302 of a fulfillment center and items are picked from storage into the cartons. However, for cartons that have only one SKU (whether one or multiple of a certain item/SKU), this operation may use a large quantity of carts to carry many cartons with single pick lines (e.g., picks of cartons having only a single SKU). Accordingly, some implementations of the technology described herein improve efficiency by introducing batch-picking carts. For example, a particular carton may have 5 of a certain type of toner, which may be stored together at a single location of a fulfillment center and, rather than carrying the carton to the location, the 5 toners may be retrieved by a batch-picking cart and transported to a station where they are picked from the batch-picking cart and placed into a shipping carton. The technology intelligently tracks the operations, providing instructions and receiving confirmation from various computing devices and/or automated guided vehicles to coordinate these operations.

The technology described herein improves throughput over placing single pick line cartons on a cart. A batch-picking cart reduces processor cycles used to group products together into a single carton or cart and increases resource utilization and flexibility. In some implementations, the technology directs a client picking device, cart, or AGV to retrieve items from several single pick line (e.g., task) orders together and bring them to a finalization station where they are placed into individual cartons. For instance, 300 cartons with a single pick-line may be carried by 10 carts (e.g., 30 cartons per cart) or the items from the 300 cartons may be placed together on a single batch cart that carries the items (e.g., together in one or more bulk containers) to a finalization station where they are placed into shipping cartons. For instance, an AGV may bring the items to a finalization station where cartons are prepared and the items are removed from the batch-picking cart and placed into the cartons, as described below.

The technology described herein may reduce the overall quantity of carts being used and increase pick density (e.g., a number of units/items picked from a location or stop of a cart over an amount of time, or a number of times a cart stops) and therefore improve overall productivity of equipment in a fulfillment center.

The technology described herein may dynamically assign cartons to the cart either before or during picking to the cart. For example, even while a batch-picking cart is being transported through a pick-to-cart area 302, the system 100 may receive order data and assign picks from that order data to the batch-picking cart.

In some implementations, pick tasks (based on the SKUs/locations to be picked, as described below) are assigned to a cart and corresponding instructions are sent to a picking client device one or two at a time, for example, a subsequent task instruction may be loaded on the client device during or before completion of a current task, so that when the current task is completed, the next task (e.g., instructions for the task on the client device) is already queued up on the device to be displayed to the picker. In some implementations, the technology may accordingly incrementally assign picks/items/SKUs/pick locations to a batch-picking cart as the cart moves through the pick-to-cart area 302. In some instances, a picker may indicate when a maximum cart capacity is reached, thereby ensuring maximum utilization of resources, such as a cart, picker, and/or a cart AGV.

Further, it should be noted that while operations herein are described in reference to a robotic system, some aspects and implementations may be applied in systems using manual pickers (e.g., human warehouse associates), conveyor mechanisms, etc., while still providing significant benefits to these systems.

With reference to the figures, reference numbers may be used to refer to components found in any of the figures, regardless whether those reference numbers are shown in the figure being described. Further, where a reference number includes a letter (e.g., suffix) referring to one of multiple similar components (e.g., component 000a, 000b, and 000n), the reference number may be used without the letter to refer to one or all of the similar components.

FIG. 1 is a block diagram of an example system 100 and data communication flow for system-directed single line pick batching. The system 100 includes a warehouse execution system (WES) 102. The WES 102 is coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108 (e.g., pick-to-voice, pick-to-light, etc.), a robot execution server (REX) 132, and a dispatch system 106.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

The REX 132 may, in some implementations, include one or more hardware and/or virtual servers programmed to perform operations, acts, and/or functionality described herein. The REX 132 may generate a schedule that defines the route for an AGV during a picking session, as described herein. For a given cart AGV 116a . . . 116n, depending on the items (e.g., identified by stock keeping units or SKUs) to be placed in the cartons of that cart, the REX 132 generates a schedule and transmits it to the dispatch system 106, which in turn deploys a cart AGV 116 according to the schedule, for instance. In some implementations, the dispatch system 106 instructs the AGV to proceed through one or more of the picking zones of the distribution facility according to the schedule. The schedule of the AGVs may be coordinated such that an optimal flow can be achieved, as discussed elsewhere herein.

The WES 102 may store productivity information for points in the distribution facility in a database (e.g., a non-transitory data store 120). The productivity information may reflect the mechanical capacity of that given point of the AGV system. In some cases, the mechanical capacity may be dynamic based on current conditions (e.g., system health, staffing levels (e.g., number of associates working in zone), stock levels, operational state, etc.).

The dispatch system 106 may be electronically communicatively coupled to a plurality of AGVs. In some implementations, the dispatch system 106, or elements thereof, may be integrated with or communicatively coupled with the REX 132. The dispatch system 106 includes hardware and software configured to dispatch the AGVs, and is coupled for communication the components of the system 100 to receive instructions and provide data. The dispatch system 106 may calculate a route to execute the task considering traffic and resources. In some cases, it adjusts the route or the task to keep the route optimum.

The AGVs may be robotic vehicles including drive units providing motive force for moving the AGVs (and, in some instances, carts, modular storage units, AGV racks, AGV shelves, etc.), guidance systems for determining the positions of the AGVs within the distribution facility, and equipment for carrying items. The equipment for carrying items may include carton holders, AGV shelves, modular storage unit holders, etc., such as carts, shelves, etc., as described in further detail in reference to FIGS. 10A and 10B, for example.

A modular storage unit (also referred to simply as a storage unit) may be a container in which items are stored, for example, in high-density storage 304. In some instances, the modular storage unit may be transported by a modular storage fetching (MSF)-AGV 114. For example, a modular storage unit may comprise a pallet or tote, which may be a holding vessel to support items designed to be picked up by an MSF-AGV 114 using a container or item handling mechanism. For example, a modular storage unit may include a pallet and a holding structure that supports items designed to be picked up by an AGV with forks or another carrying surface. In some implementations, a pallet may be stackable. In some implementations, a pallet may be attachable to a container to form a modular storage unit.

Figure 3:
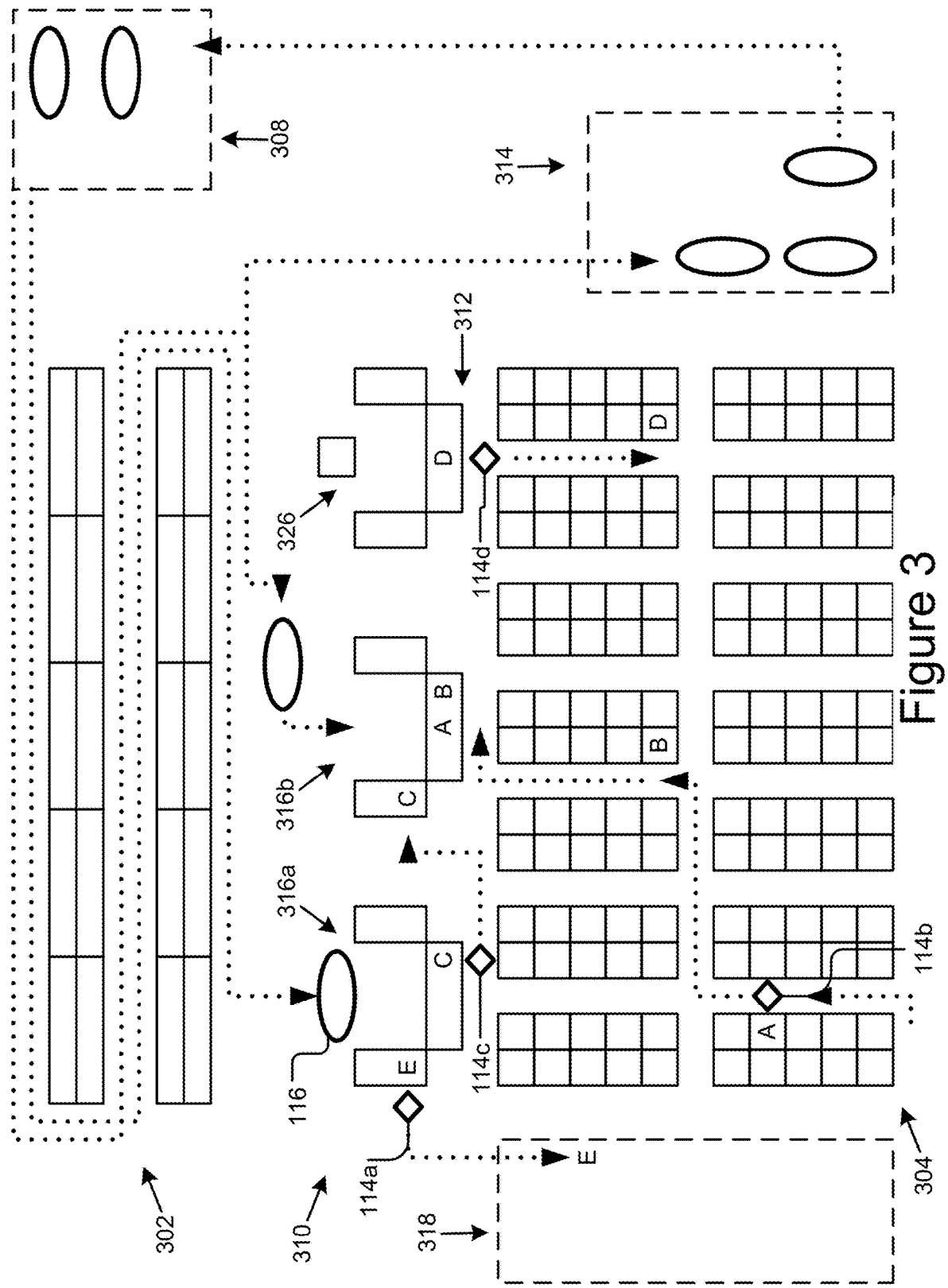
FIG. 3 is a schematic of an example configuration of a distribution facility layout, which may be an operating environment of carts, pickers, and/or AGVs.

A cart AGV 116 may be an automated guided vehicle or robot configured to autonomously transport carton from a preparation or induction area 308 to a pick-to-cart area 302 of the distribution facility, a goods-to-person station, and/or finalizing area 314 (e.g., as described in reference to FIG. 3). The cart AGV 116 may include a drive unit adapted to provide motive force to the cart AGV 116 and a guidance system adapted to locate the cart AGV 116 in the distribution facility. In some implementations, the cart AGV 116 is adapted to autonomously transport a batch-picking cart or holder (e.g., a cart or shelves) that is, in turn, adapted to hold items. For example, a cart AGV 116 may push/pull a cart holding containers or items around a pick-to-cart area 302 and/or goods-to-person area 310 and may automatically stop at storage bays of the pick-to-cart area 302 where items to be picked are stored, so that a picker in the pick-to-cart area 302 can easily place items onto a cart. In some instances, the cart AGV 116 may transport the cart to a goods-to-person, finalization, or pick-cell station 316 to receive additional items from high-density storage (e.g., from modular storage units in high-density storage, as described below) or to place the items into shipping cartons. In some instances, the cart AGV 116 may move at walking speed next to, behind, or in front of a picker walking through the pick-to-cart area 302 of the distribution facility. Additional details of example cart AGVs 116 are shown and described in reference to FIGS. 10A and 10B.

An MSF-AGV 114a . . . 114n may include an automated guided vehicle or robot that may be configured to autonomously transport items from a high-density storage area 304 of the distribution facility to a goods-to-person station (e.g., a pick-cell station 316 or cartless station 326), replenishment area 318, and/or finalizing area 314. The MSF-AGV 114 may include a drive unit adapted to provide motive force to the MSF-AGV 114, a guidance system adapted to locate the MSF-AGV 114 in the distribution facility, and a shelving unit, which may be adapted to hold modular storage units. The MSF-AGV 114 may include a container handling mechanism (CHM) that retrieves items or modular storage units from storage shelves (e.g., in the high-density storage area), places items on an item holder (e.g., an AGV shelf) coupled with the MSF-AGV, and replaces items on storage shelves or at a goods-to-person station. In some implementations, an MSF-AGV 114 may autonomously retrieve modular storage unit(s) containing items to be picked in an order from the high-density storage area. For instance, the MSF-AGV 114 may transport the modular storage unit(s) to a pick-cell station 316, so that a picker at the pick-cell station 316 can pick items from the modular storage unit(s) and place them on a cart. For example, a cart AGV 116 may transport a carton to a bay in the pick-to-cart area 302 having a first item in an order, then to a pick-cell station 316 where a separate MSF-AGV 114 has delivered or will deliver a second item (e.g., in a modular storage unit) in the order, so that a picker can place the second item into the carton with the first item, and so on and so forth. The process may be repeated as necessary, depending on the number of items to be placed in the carton(s) of the pick-cell station 316. The system 100 may coordinate the timing, placement, and movement of the cartons, modular storage units, pick-cell station 316 workload, and AGVs to bring cartons and modular storage units having items corresponding to an order to the same pick-cell station 316 during the same time window, as described in further detail herein.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain carton data 124 in the data store 120. The carton data 124 includes information about cartons and/or containers in the system 100, such as a unique identifier for each carton or container, a carton or container type, the zones or areas a carton will visit, the number of pick lines a carton proceeds through, and the priority for the carton. Some cartons or orders may have a higher priority relative to other cartons and the system 100 may expedite handling of those cartons with higher priority relative to other cartons by the system 100. The carton data 124 may include a picklist defining the items the carton will contain. The WMS 104 may store data mapping items to the different pick zones (e.g., the pick-to-cart area 302, the high-density storage area 304, a particular modular storage unit, a particular location at a particular goods-to-person station, etc.). In some implementations, the WMS 104 may be configured to communicate the carton data 124 with the WES 102, the picking system 108, and/or dispatch system 106 in real time, in batches, as requested by these components, etc.

In some implementations, the system 100 may include a release logic engine 142, although it should be noted that the features and operations of the release logic engine 142 may be implemented on or distributed among other components of the system 100. The release logic engine 142 may include computer systems and/or logic that perform operations described herein. For instance, the release logic engine 142 may receive data describing capacity and performance of system resources, such as workstations that print cartons, cart AGVs that transport carts, goods-to-person stations (e.g., pick-cell stations 316 or cartless stations 326), picking system client devices, conveyors, etc., and may direct operations of the resources.

The release logic engine 142 may receive a trigger to release a batch of cartons for a cart (e.g., a cart may hold 30 cartons) and may, based on priority, pick location, replenishment, cycle times, affinity, etc., select the batch of cartons for the cart. The release logic engine 142 may also release cartons to goods-to-person stations (either using carts or without using carts) in the fulfillment center. It should be noted that, although many of the operations are described herein in reference to a robotic system, the release logic engine 142 may also instruct human pickers and other distribution facility/center associates to prepare the cartons, transport carts, etc., as described herein, for example, by transmitting data to picking computing devices of the human associates instructing the computing devices to display instructions for carton preparation.

The picking system 108 may, in some implementations, include one or more hardware and/or virtual servers or software routines storable in one or more non-transitory memory devices and executable by one or more processors to perform the operations, acts, and/or functionality described herein. In some implementations, the picking system 108 may include a client picking device, which may be a handheld or mobile device, for example, that may output audible or graphic instructions, receive input, scans, or other confirmations, and/or perform other operations. The picking system 108 may receive pick confirmations, for example, from pickers or operators (e.g., using barcode scanners, NFC, RFID chips, or other sensors or input methods) working within a pick zone (e.g., a pick-to-cart area 302, goods-to-person station, etc.) confirming that picks for a given carton have been performed, as described in further detail below. An example picking system 108 may include an available pick-to-voice or a pick-to-light system. The picking system 108 may be configured to communicate the pick confirmation data with the WES 102, WMS 104, or other components of the system 100 in real time, in batches, as requested by the components of the system 100, etc.

The picking system 108 may receive confirmatory input (e.g., pick confirmations) from pickers working within a pick zone or on a certain cart. The confirmatory input confirms that picks for a given cart or carton have been completed. The picking system 108 transmits the confirmatory input to the WES 102. The confirmatory input may include a timestamp reflecting completion of the picks, a unique identifier identifying the picker (operator), a unique identifier identifying the pick, a unique identifier identifying the AGV, and/or a unique identifier identifying the carton (e.g. a carton number), etc.

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, etc. In some instances, the data store 120 may also include, conveying system attributes, picking data, picker attributes, sensor data, etc.

The data store 120 may be included in the WES 102, WMS 104, REX 132, or in another computing system and/or storage system distinct from but coupled to or accessible by the WES 102, WMS 104, REX 132, or other components of the system 100. The WES 102, picking system 108, REX 132, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3-dimensional layout of the facility including the location of modular storage units, picking areas, lanes, equipment 110, storage shelving units, items, AGVs, etc. Map data 122 may indicate the attributes of the distribution facility, including attributes of resources (e.g., one or more pick-to-cart areas 302, high-density storage areas 304, induction areas 308, finalizing areas 314, goods-to-person stations, replenishment areas 318, etc.). For example, attributes of zones may include the number, quantity, and location of shelving units or bays, modular storage units, items, guidance system locators or markers, etc.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in a distribution facility. The item data 130 may include unique identifiers for these items, the item volume (e.g., the total amount picked in a given window (e.g., in an hour, day, etc.)), the item velocity (e.g., number of different times item picked in a given window (e.g., per hour, day etc.), the unique location of the items within the distribution facility (aisle, shelf, shelf position, etc.), other attributes of the item (e.g., size, description, weight, quantity of items in a package, color, etc.), item inventory, mapping of items of modular storage units, etc. In some implementations, the item data 130 may include the quantity of particular items a modular storage unit contains, the current location of a modular storage unit, a preferred storage location of items and/or modular storage units, a threshold inventory level of items to be satisfied before autonomously transporting the modular storage unit to a replenishment area 318 by an MSF-AGV 114 (e.g., to restock the items in the modular storage unit).

The AGV data 128 may describe the state of an AGV (operational state, health, location, battery life, storage capacity, items being carried, cartons, etc.), whether picker is assigned to it, etc.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2:
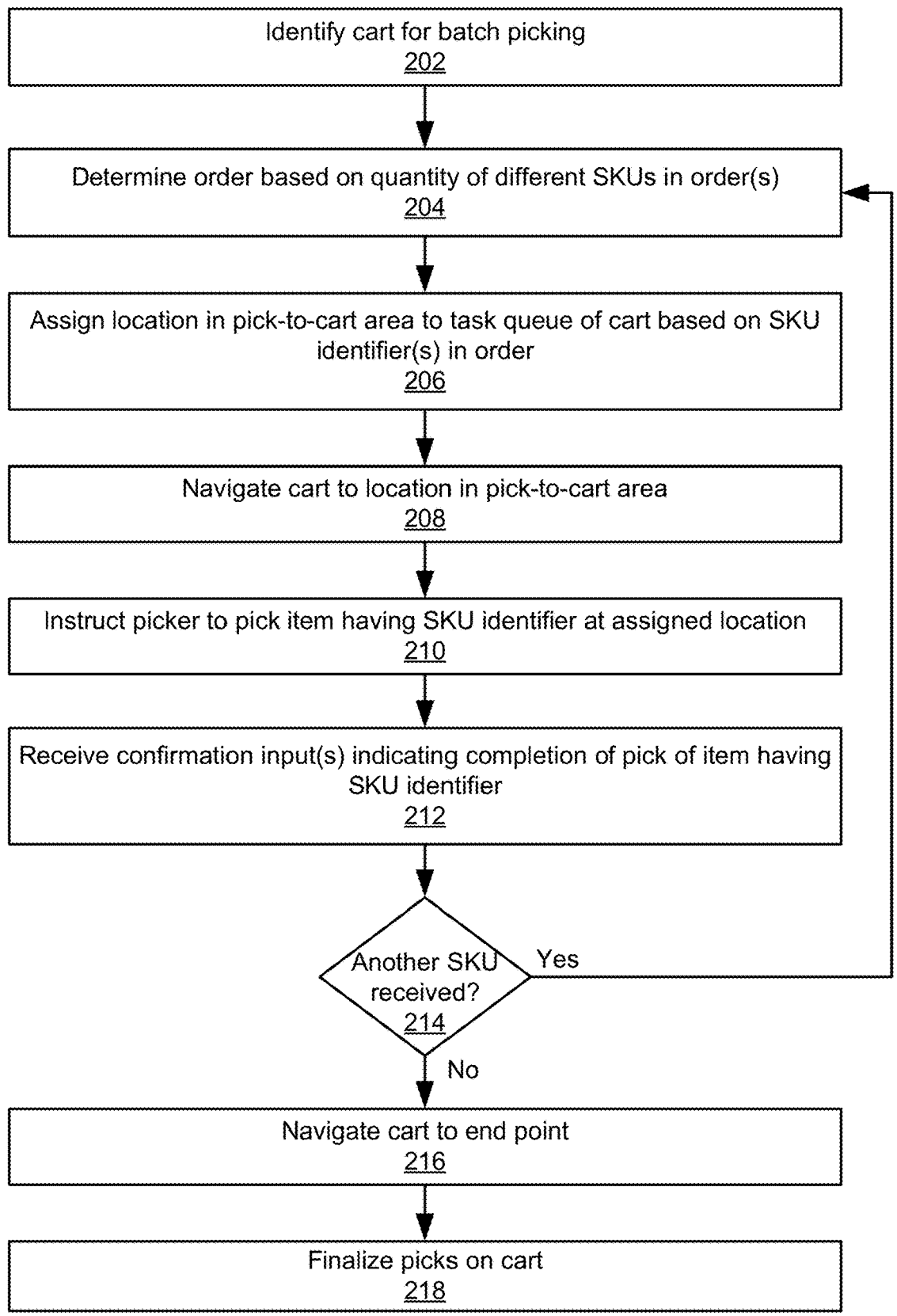
FIG. 2 is a flowchart of an example method for system-directed single line pick batching.

FIG. 2 is a flowchart of an example method for system-directed single line pick batching. It should be noted that the operations of the method may be performed by various components of the system 100, such as the release logic engine 142, WES 102, or picking system 108. In some implementations, the operations may be split between different components or otherwise distributed. Additional or alternative details or operations of the method of FIG. 2 may be described in reference to FIGS. 4A-9 herein, for example, by combining, exchanging, augmenting, removing, or reordering the operations and features, although other implementations are possible and contemplated herein.

In some implementations, the system 100 may receive order data representing a set of orders. For instance, the first order data may indicate stock keeping units ("SKUs") included in the set of orders. The order data may be received continuously as individual orders are received or in waves from another system or component of the system 100. The SKUs, for example, may be types of items represented by SKU identifiers, which may be codes, for instance, that identify the SKUs.

For instance, the data may describe a set of orders having one or more SKU identifiers associated with one or more items. The system 100 may receive first order data representing an initial set of orders and sort the initial set of orders into an eligible set of orders that are eligible for a single-line batch release using a batch-picking cart. For instance, the initial set of orders may be sorted based on those orders having a single SKU identifier per order. For example, the orders may include only a single item or may include multiple copies of the same item with the same SKU identifier. For instance, the orders may have no variation in items in each individual order. In some instances, although each individual order may include only a single SKU, the SKUs may vary across a group of orders. It should be noted that other quantities, variations, specific sub-sets of SKUs, etc., may be used to determine order eligibility.

In some implementations, the system 100 may use additional or alternative criteria for determining eligibility of an order, group of orders, picking tasks, or single item pick. For instance, eligible orders or item picks may be determined based on their locations in a pick-to-cart area 302, their size or weight, their inventory level, or other factors.

At 202, the system 100 may identify a cart for single-line batch picking. In some implementations, the system 100 may determine, from a database and/or communication with carts (e.g., with cart AGVs or computing devices coupled with the carts) whether a cart is available. In some instances, the system 100 may receive scan data from a client picking device, which indicates a particular cart for use as a single-line batch-picking cart.

The cart may hold totes, buckets, shelves, or other mechanisms for holding items that are picked onto the cart. For example, a cart may be a cart packed with reusable totes.

In some instances, the system 100 may dispatch a single-line batch-picking cart in a fulfillment center. The cart may or may not be coupled with a cart AGV 116. In some implementations, the system 100 may transmit an instruction to a cart AGV to couple with a batch-picking cart and navigate within the fulfillment center while transporting the batch-picking cart.

In some implementations, the system 100 may receive scan data from a client device, such as a picker's client device, identifying the cart. The system 100 may determine the cart and/or a current location of the cart in a fulfillment center, for example, based on the scan data, a beacon in the fulfillment center (e.g., in the fulfillment center or attached to the cart), or another localization method.

In some implementations, an AGV, as described further below, may navigate to the location of the cart, couple with the cart (although, in some instances, the AGV may be already coupled with the cart), and transport the cart. For instance, the cart may be dispatched from its current location (e.g., a parking spot in an induction or preparation area) to another location, such as the pick-to-cart area 302 in a fulfillment center, using a cart AGV 116.

In some implementations, at 204, the system 100 may determine an order (e.g., an online order of a product, a pick task, a group of tasks, etc.). For instance, the order may be determined based on a SKU identifier, a variation of SKU identifiers in a single order, or another criteria to identify, for example, an eligible order, as described above.

In some implementations, the system 100 may determine a first order from the set of orders based on a quantity of different SKUs in the first order. For instance, individual orders in the set of orders may include one or multiple different SKUs. The system 100 may filter the orders based on how many different SKUs each order includes. In some instances, only orders with single SKUs may be selected (whether a single or multiple instances of the SKU). For example, a first order may include a package of Brand Y pens (a first SKU), which are stored at a certain location in the pick-to-cart area 302 of the fulfillment center.

In some implementations, the system 100 may additionally or alternatively sort the orders available for batch picking based on their locations in the pick-to-cart area 302 of the fulfillment center. For instance, as described below, certain locations associated with SKUs may be sorted based on those locations that are located after a current cart location along a path through the pick-to-cart area 302, common locations of previously assigned (e.g., to the cart) SKU picks, proximity to previously assigned locations, etc.

At 206, the system 100 may assign an order, item, or location in the pick-to-cart area 302 to a task queue of the identified cart based on the SKU identifier(s) in the order(s). Assigning the location may be based on a first item (e.g., corresponding to a first SKU identifier) being located at or near the location. For instance, the data store 120 may store a table matching each SKU stored in the pick-to-cart area 302 with its location, available inventory, size, attributes, or other information.

In some implementations, assigning the first location to the task queue of the first cart includes determining the first order from among the set of orders based on a quantity of different SKU identifiers in each of the set of orders. The system 100 may then determine the first location based on a location at which the first item having the first SKU identifier is stored in the pick-to-cart area 302. For instance, the order may be selected based on it having on a single SKU identifier.

In some instances, the system 100 may group a plurality of orders by their SKUs in order to determine a quantity of SKUs to be picked to the cart across the orders assigned to the cart. The system 100 may assign a location having one or a plurality of instances of the same SKU to the single-line batch-picking cart, as described below. For example, in some implementations, the system 100 may determine a first quantity of the first SKU in the first order, a second quantity of the first SKU in a second order and sum the first and second quantities to determine a total quantity of the SKU to be picked from the first location to the cart.

In some implementations, the system 100 may assign multiple locations to the cart at the same time (e.g., prior to navigating the cart to a next location). For instance, the system 100 may assign two pick locations (e.g., two SKUs) to a task queue of the cart. Responsive to the defined number of locations are assigned, the system 100 may dispatch an AGV coupled with the cart to a first location in the pick-to-cart area 302.

In some implementations, if there are two batch-picking carts that receive picks at the same time, the system 100 may intelligently assign locations to each cart. For instance, if a certain location to be assigned to a cart is ahead (at a future point along the path of the cart) or is eligible for either cart, it may be first assigned to the cart that is further along a path through the pick-to-cart area 302 in order to increase picking opportunities and efficiency of the carts. For instance, if the first batch-picking cart is 1% through the pick-to-cart area 302, the second batch-picking cart is 50% through the pick-to-cart area 302, and the new location is 51% through the pick to cart area, the system 100 may assign the new location to the second batch-picking cart, so that the location is picked sooner and does not reduce the picking potential (i.e., the potential number of items that could be assigned to a cart due to its capacity or time constraints) of the first batch-picking cart.

At 208, the system 100 may navigate the cart to the location in the pick-to-cart area 302. For example, the system 100 may couple an AGV with the cart and use the AGV to transport the cart, although, in some instances, it may additionally or alternatively issue instructions to a client device indicating for a picker to guide the cart. As described above, the AGV may have having a drive unit adapted to propel the AGV, a guidance system adapted to locate the AGV in an operating environment (e.g., in the pick-to-cart area 302), and/or a controller adapted to receive instructions and navigate a cart using the drive unit and the guidance system based on the instructions.

At 210, the system 100 may instruct a picker to pick an item having the SKU identifier at the assigned location in the pick-to-cart area 302. For example, the system 100 may transmit (e.g., using the picking system 108) an instruction to a picker client device to display an instruction to a picker. For instance, the system 100 may transmit a first pick instruction to a client device associated with the batch-picking cart. The first pick instruction may indicate a first quantity of the first SKU stored at the first location. For example, the system 100 may assign a location and, in some instances, a quantity of the first SKU to the particular batch-picking cart. A picking instruction indicating the assignment may be digitally pushed to (or retrieved by) a client picking device, which may be a computing device mounted to the cart, the cart AGV, or fixed shelving in the pick-to-cart area 302 or a mobile computing device carried with a human picker. For instance, the client picking device may be a handheld computer that receives picking instructions, outputs/displays SKU descriptions (e.g., identification, attributes, quantity, location, etc.), receives scans of the storage locations, items (e.g., a barcode), or a cart, and/or receives user input indicating picks have been completed.

Although not illustrated in the figures, it should be noted that, in some implementations, a picker may be a robotic device adapted to manipulate items to move them from a first location to a second location (e.g., from a storage shelf to a tote or other container on a cart).

In some implementations, as a pick is being performed, the client picking device may receive one or two sequential pick instructions, so that when a current pick is complete, a second pick is queued and ready to be performed without delay (e.g., due to calculation or downloading of the subsequent pick instruction). By pre-loading the next pick instruction, downtime is reduced. Additionally, by reducing the quantity of pre-loaded or assigned pick instructions, the system 100 increases flexibility of the cart and future assignments.

In some implementations, a location assigned to the batch-picking cart in a picking instruction may include a larger quantity of the SKU than a picker can easily count or carry from the storage location to the cart. For instance, a picking instruction may include 25 industrial toner cartridges to be picked to the cart for one or multiple cartons (e.g., from one or multiple orders) while the picker may only be able to reasonably carry three cartridges at a time. In such instances, the client picking device may display a graphical user interface providing the option to split the pick/quantity into multiple picks of reduced quantities.

In some implementations, the system 100 may receive, from the client picking device, a first input requesting to split the pick of the first quantity of the first SKU from the first location into multiple picks. For instance, the input may include a picker selecting a graphical element requesting to "split pick" or indicating "hands full."

In some instances, the system 100 may also receive a second input indicating a second quantity of the first SKU for at least one split pick (e.g., one of multiple picks into which a single pick may be divided), for example, the user may request a number of items (e.g., cartridges, packages, etc.) to pick per split pick. The system 100 may divide the first quantity by the requested number/quantity to determine a quantity of split picks used to complete picking of the first quantity of the first SKU. For instance, instead of a single task of 25 items, it may be split into multiple tasks, each of which have fewer items (e.g., 3, 3, 3, 3, 3, 3, 3, 3, 1).

In some instances, the system 100 (e.g., via the client picking device) may issue individual instructions and/or receive individual pick confirmations (e.g., inputs via a GUI, scans of items, scans of the cart, etc.) for each split pick. For example, the system 100 may receive a confirmation message after each split pick and track progress of the split picks based on the confirmation messages, as described in reference to 212 below.

Accordingly, while picking a large quantity of a given SKU may cause pick errors, especially when a picker has to make multiple trips between the storage location and the cart in order to complete a single pick instruction, splitting the pick task into split picks and tracking each split pick/subtask may reduce these errors. Further, by tracking incremental completion of portions/created subtasks of picks of multiple items, the system 100 may allow a picker to pause (e.g., for a break) or a new picker to be assigned to the cart mid-way through picking the items.

In some implementations, the system 100 may automatically surface an option in a displayed GUI on the client picking device to split the pick based on attributes of the pick. For example, if a quantity and/or size of the item exceeds a threshold, the system 100 may ask the picker if s/he wishes to split the pick.

At 212, the system 100 may receive one or more confirmation input(s) indicating completion of a pick of the item having the SKU identifier. For example, the system 100 may receive, from the client picking device, one or more confirmation messages indicating completion of the pick of the first quantity of the first SKU from the first location to the batch-picking cart. For instance, a user may scan the item (e.g., a UPC or barcode) and/or cart to indicate that the pick of that item to the cart has been completed. In some instances, if the pick is split, the user may receive and track completion of each portion (e.g., a quantity of copies of an item) of the pick.

In some implementations, the confirmation may include receiving item scan data from a picker client device. For instance, a picker may scan a UPC (universal product code), RFID (radio frequency identification) tag, label, or other identifier on the item, capture an optical image, or provide another input, which the system 100 may use to identify a SKU of a physical item. The system 100 may use the item scan data to identify a picked item (and/or item quantity), so that the system 100 may match the assigned SKU identifier and verify that the correct item has been picked.

Additionally or alternatively, the system 100 may receive a cart confirmation input from a picker client device, cart AGV 116, or computing device coupled with the cart, for example, to indicate that the item is placed into the cart. In some implementations, a picker client device may scan a label (e.g., UPC, RFID tag, or other identifier) attached to or associated with the cart to confirm that the item is placed into/onto the correct cart.

In some implementations, a confirmation input may include a confirmation that a cart is full. For instance, when a cart has a sufficient quantity of items held thereon, for example, to satisfy its capacity, it may be automatically or manually marked as complete or full. For example, after a certain number of items picked or distance through the pick-to-cart area 302 traveled, the system 100 may automatically surface a graphical user interface on a picker client device asking if the cart's capacity has been reached. If the user provides an input confirming that the cart is full, the system 100 may cease assigning items, picks, or locations to the cart. In some instances, the system 100 may then navigate the cart (e.g., using a cart AGV 116) or instruct it to be transported to a finalization area 314 of a fulfillment center, as described in reference to 216 and 218 below.

At 214, the system 100 may determine whether another SKU identifier has been received and/or assigned to the cart. In some implementations, if another SKU identifier has been received, the system 100 may return to 204 or 206, for instance, to assign the item and/or location to the cart (or, potentially, a second cart). Additional example, operations for assigning a new carton, order, or SKU to the cart are described in further detail in reference to FIGS. 7A-9 below.

In some implementations, the system 100 may assign a new location or SKU during transit of the batch-picking cart or after another pick to the cart has been performed. For example, the system 100 may receive, after dispatching the batch-picking cart, order data representing a second order where the second order includes a pick of an item having a second SKU.

The system 100 may determine a second location at which the second SKU is stored in the pick-to-cart area 302. In some instances, the system 100 may determine that the second location is located after the first location on a path of the batch-picking cart. For instance, as a cart moves through a pick-to-cart area 302, locations may be assigned that do not require the cart to backtrack. In response to determining that the second location is eligible to be assigned to the batch-picking cart, the system 100 may transmit a second pick instruction to the client device, for example, indicating a second quantity of the second SKU stored at the second location.

In some instances, the second item may be the same SKU as the first item and, when the second item is assigned, the system 100 increases the quantity of items at the location to be picked.

For example, after dispatching a cart (e.g., using a cart AGV 116), the system 100 may receive order data (e.g., while the cart AGV 116 is already moving through the pick-to-cart area 302 or receiving picks) representing a second order. The second order may include a second SKU identifier. As described above, the system 100 may determine a location of an item with the second SKU identifier and determine that the location or item is eligible for the particular cart. For instance, the second location may be located after one or more already assigned and/or picked locations on a task queue/list and/or path of travel for the cart. In some implementations, if the second location or second item are selected (e.g., based on location, cart capacity, pick priority, etc.), the system 100 may assign the second location to the cart/its task queue. In some instances, the system 100 may transmit a second pick instruction to one or more client devices associated with a picker. The second pick instruction may describe the items, a quantity to pick, attributes of the items, etc.

In some implementations, the system 100 may assign the order, SKU, or location to a second cart. For instance, the system 100 may identify a second cart and assign a second location to the second task queue of the second cart. The system 100 may select to which cart to assign the second location based on the cart that is currently closer to the second location, whether the cart has passed the second location along its path of travel through the pick-to-cart area 302, an available capacity of the cart(s), a relative amount in carts' task queues (e.g., to balance workload among carts or reduce travel time of some carts), or another criteria.

At 216, the system 100 may navigate the cart to an end point, for example, in response to receiving a confirmation input or message indicating pick completion or otherwise determining satisfaction of a condition for finalizing the picks on the cart. For example, as noted above, the input may indicate that the cart is full or has reached the end of the pick-to-cart area 302 and, in response, the system 100 may transport the cart to a finalization station (e.g., using an AGV).

For example, a cart AGV 116 may transport the batch-picking cart to a goods-to-person, cartless, pick-cell, or finalization station at which items may be picked from the cart into cartons. In some implementations, the system 100 may receive, from the client device, a message indicating that the batch-picking cart is full and, in response, transport the batch-picking cart to a finalization station, for example, using a cart AGV 116. For instance, by allowing a picker to determine when the batch-picking cart is at maximum capacity or that a time threshold associated with a priority of the cart or picks has been met, the system 100 allows flexibility while increasing utilization of the cart.

At 218, the system 100 may finalize the picks on the cart. In some implementations, the system 100 may finalize cartons with SKUs at a finalization station where the system 100 may coordinate instructions sent to client devices instructing a picker (whether the same picker that picked items to the cart or a different picker, robotic device, or fulfillment center associate) to remove an item from the cart and place it into a carton. For instance, the system 100 may identify a carton associated with the SKUs picked to the cart, for example, as determined at 204, and issue an instruction identifying the SKU and/or carton to a client device or picking robot.

The system 100 may determine that the cart is at a finalization station at which it may receive a scan of an item and identify an order having a SKU identifier corresponding to the item. For instance, based on the item scan, it may automatically perform operations, such as printing a carton shipping label, building a shipping carton, etc. For example, the system 100 may receive scan data identifying an item, determine an associated order, and automatically print a label associated with the first order. For instance, the system 100 may automatically print or issue a shipping label, packing slip, hazmat sticker, or other item based on the scan or other input. In some instances, the system 100 may also automatically print or build a carton or otherwise instruct the picker to prepare the shipping carton. For example, the system 100 may transmit a finalization instruction to a client computing device of the finalization station indicating to prepare a shipping carton including placing the item in the shipping carton and attaching the label to the shipping carton.

For example, a picker at the finalization station may retrieve an item from the cart and scan the item. Using the scan, the system 100 may automatically identify an order and/or carton that includes the item/SKU, and print a label associated with the order and/or carton. The system 100 may also issue an instruction to the picker to prepare a carton including placing the item into the carton, placing the printed label on or in the carton, and/or erecting the carton. In some instances, the user may then place the prepared carton on a separate AGV or conveyor that carries the carton to a delivery vehicle or other subsequent step.

In some instances, when the picker scans the item, the system 100 may determine that a carton includes a single instance of the SKU and automatically proceed, as described above, to print the label and/or prepare the carton. If, on the other hand, the system 100 determines that there are multiple copies of the scanned SKU assigned to a single carton, the system 100 may additionally direct the picker to pick the additional copies of the SKU to the carton.

It should be noted that the operations described in reference to the method in FIG. 2 may be changed, re-ordered, or removed from the process without departing from the scope of the technology described herein, and that the operations are not inclusive of all possible operations. The operations described in reference to FIG. 2 may be illustrated and/or described in more detail the example methods of FIGS. 4A-9.

FIG. 3 is a schematic of an example configuration of a distribution facility layout, which may be an operating environment of one or more pickers, MSF-AGVs 114, and/or cart AGVs 116. It should be noted that the distribution facility may also be referred to as a fulfillment center herein and may represent a building or group of buildings in which items may be picked into cartons and/or from which cartons are shipped to fulfill orders. In some instances, some or all of the operating environment may be divided into one or more zones or areas, as described above. It should be understood that various distribution facilities may include different picking areas having different stocking infrastructure and picking configurations. For instance, high-volume and/or velocity items (e.g., items appearing above a defined threshold of frequency in orders) may be stored in a pick-to-cart area 302 and be available for immediate picking, and relatively moderate and/or low-volume and/or velocity items may be stored in high-density storage area 304 on modular storage units which may be retrieved by MSF-AGVs 114 for an upcoming pick.

The layout depicted in FIG. 3 includes various areas: an induction area 308, a pick-to-cart area 302, a goods-to-person area 310, a goods-to-person staging area 312, a high-density storage area 304, a finalizing or finalization area 314, and a freight or modular storage unit elevator (not shown) for multi-level access when the layout includes multiple floors. In some cases, the layout may include multiple levels of mezzanine with one or more of the different zones/areas. In some implementation, cart AGVs 116 are staged in the induction area 308 and are set up for picking sessions. In some implementations, cartons are assembled, labeled with unique scannable visual identifiers to associate them with specific orders, and are placed on the supports (e.g., cart shelves) of the cart AGVs 116 in the induction area 308. In some implementations, an induction area 308 may include one or more workstations for creating and/or printing one or more cartons, as described above.

The pick-to-cart area 302 may be configured for high-velocity and/or volume items and advantageously reduces capital associated to handle this type of item class. Inventory may be stored in high-volume storage in containers or pallets, for example. High-velocity items may be divided into pick zones or aisles and each zone or aisle may include a plurality of bays (e.g., 4, 5, 6+), which may be balanced by the SKU routing engine and/or WES 102 based on demand by the SKU routing engine. Cart AGVs 116 may be scheduled by the REX 132 to autonomously visit these zones, and pickers accompanying the cart AGVs 116 may be guided by the picking hardware (e.g., pick-to-voice and/or pick-to-light) controlled by the WES 102. In an example, a cart AGV 116 is instructed by the REX 132 to stop directly in front of a bay location. The cart AGV 116 may self-locate using a guidance system. For example, the guidance system may include guidance system locators or markers, such as guide tape (magnetic, colored, etc.), laser target navigation, inertial navigation, vision guidance, geolocation, QR codes on the floor of the order fulfillment center, RFID (radio frequency identification) tags, beacons, etc., that can be used to locate and navigate AGVs in the order fulfillment center. Further, the AGVs may include guidance system components configured to read the guidance system locators, such as a QR code reader, wireless radio, etc.

After the picker picks the item and confirms the pick with the picking hardware, the cart AGV 116 autonomously moves to the next sequential bay until the picks are complete. As shown in FIG. 3, a cart AGV 116 has the capability to bypass zones, bays, shelves, etc., without picks.

In some implementations, the goods-to-person area 310 may include pick-cell stations 316a and 316b situated along path(s) via which the cart AGVs 116 are routed. In some implementations, the goods-to-person area 310 may include one or more cartless stations 326 in which cartons are built and/or items are picked to cartons, for example, modular storage units may be brought to cartless station 326, as described above. Although the goods-to-person stations are shown positioned in a row, they may be located anywhere in the distribution facility. For instance, pick-cell station(s) 316 may be located between the pick-to-cart area 302 and the high-density storage area 304 and the goods-to-person station(s) 326 may be located near a conveyor, the high-density storage area 304, the finalization area 314, or another location in the distribution facility.

In some instances, a goods-to-person station 326 may have equipment for building and/or printing cartons and/or their labels. In some implementations, a goods-to-person station 326 may include or be adjacent to a conveyor or other mechanism for sending cartons to the cartless station 326 or receiving picked cartons from the goods-to-person station 326. In some instances, a pick-cell station 316 may serve as a goods-to-person station 326, for example.

In FIG. 3, the pick-cell stations 316 are situated opposing a portion of the pick-to-cart area 302 and the cart AGVs 116 may be routed to visit one or more of these pick-cell stations 316 depending on the items that are assigned to be picked and placed in the cartons of these cart AGVs 116. In the case that in given cart AGV 116 does not include any items from the goods-to-person area 310, it may bypass it entirely and proceed to the finalizing area 314.

In some implementations, for a given picking session, the REX 132 may establish a single line picking configuration in which the picker and the cart travel through an inventory pick path along a single line until the picks are fulfilled. In further implementations, based on demand, a fast-moving area may be established by the REX 132 that includes multiple routes: a higher speed line that includes single line picking for low-demand items and another area for high demand items. This combination can advantageously balance daily labor.

The layout may also include a replenishment area 318 in which modular storage units are replenished with items. For instance, item inventory in a given modular storage unit may be replenished by an MSF-AGV 114 that picks the modular storage unit from static shelves and transports them to the replenishment area 318 where a case may be opened and items from the case placed directly into the modular storage units. One or more items (whether of the same type of item or different types) can be placed in a given modular storage unit. In some cases, the modular storage unit may be replenished while it is in the static shelf. Having multiple options (manual or AGV) for replenishment has more flexibility to adjust to resource allocation and schedule. Additionally or alternatively, the MSF-AGV 114 can swap out the modular storage unit with another containing the same SKUs which has been prepared ahead of time and staged for that purpose.

In some implementations, the REX 132 may instruct MSF-AGVs 114 to replenish and distribute modular storage units in different locations of the high-density storage area 304 based on order history. In these implementations, items with high order frequency orders may be distributed in more locations than items with lower order frequency. The WES 102 may maintain a moving minimum based on order quantity minimizing the need to use inventory from two locations to fulfill an order, and the REX 132 may schedule the AGVs accordingly.

The modular storage units storing items may be moved by MSF-AGVs 114 from high-density storage area 304 into a staging area 312 and staged for movement into a goods-to-person station for an upcoming pick. In some implementations, the storage units of faster-moving items may be moved directed to a pick cell 316 in a given pick-cell station 316 or cartless station 326 (e.g., a cartless station 326 may also include pick cells 316).

In further implementations, the REX 132 may instruct an MSF-AGV 114 to transfer a modular storage unit between cells of a pick-cell station 316, or between goods-to-person stations 316 or 326 without having to expend the time to return the modular storage unit to the high-density storage area 304.

FIG. 3 also illustrates example paths of AGVs through the order fulfillment center. The paths are represented by dotted lines, cart AGVs 116 are represented by ovals, and MSF-AGVs 114a . . . 114d are represented by diamonds.

Example cart AGV paths are illustrated in FIG. 3, for example, a cart AGV 116 may navigate from an induction area 308 on a path through the pick-to-cart area 302 and then to one or more pick-cell stations 316. Once the picks for the cart AGV 116 have been completed, it may navigate to a finalizing area 314 where cartons are prepared for shipment, for example. In some implementations, the finalizing/finalization area 314 may include one or more carton removal mechanisms, as described above, and conveyors or other mechanisms for conveying cartons away from the carton removal mechanism(s). Once the cartons have been removed from the cart AGV 116, the cart AGV 116 may return to the induction area 308 to start through the process again.

Example MSF-AGV paths are also illustrated in FIG. 3, for example, an MSF-AGV 114a may transport a modular storage unit E from a first pick-cell station 316a to a replenishment area 318 for replenishment. An MSF-AGV 114b may retrieve a first modular storage unit A from a first location, navigate to a second location, retrieve a second modular storage unit B, and transport both the first and second modular storage units A and B to a pick-cell station 316b. An MSF-AGV 114c may retrieve a modular storage unit C from a first pick-cell station 316a and transport it to a second pick-cell station 316b. An MSF-AGV 114d may retrieve a modular storage unit D and transport it back to the high-density storage area 304. It should be understood that these paths and implementations are provided as examples and that other combinations are possible and contemplated herein. For example, one or more MSF-AGVs 114 may perform some or all of the paths illustrated as well as others not illustrated in FIG. 3. Further, as described elsewhere herein, the automation of the MSF-AGV 114 may be performed in synchronization with other actions (e.g., automation of cart AGVs 116, picking sessions or windows, movement of other AGVs or pickers, etc.) in the hybrid modular storage fetching system.

Figure 4A:
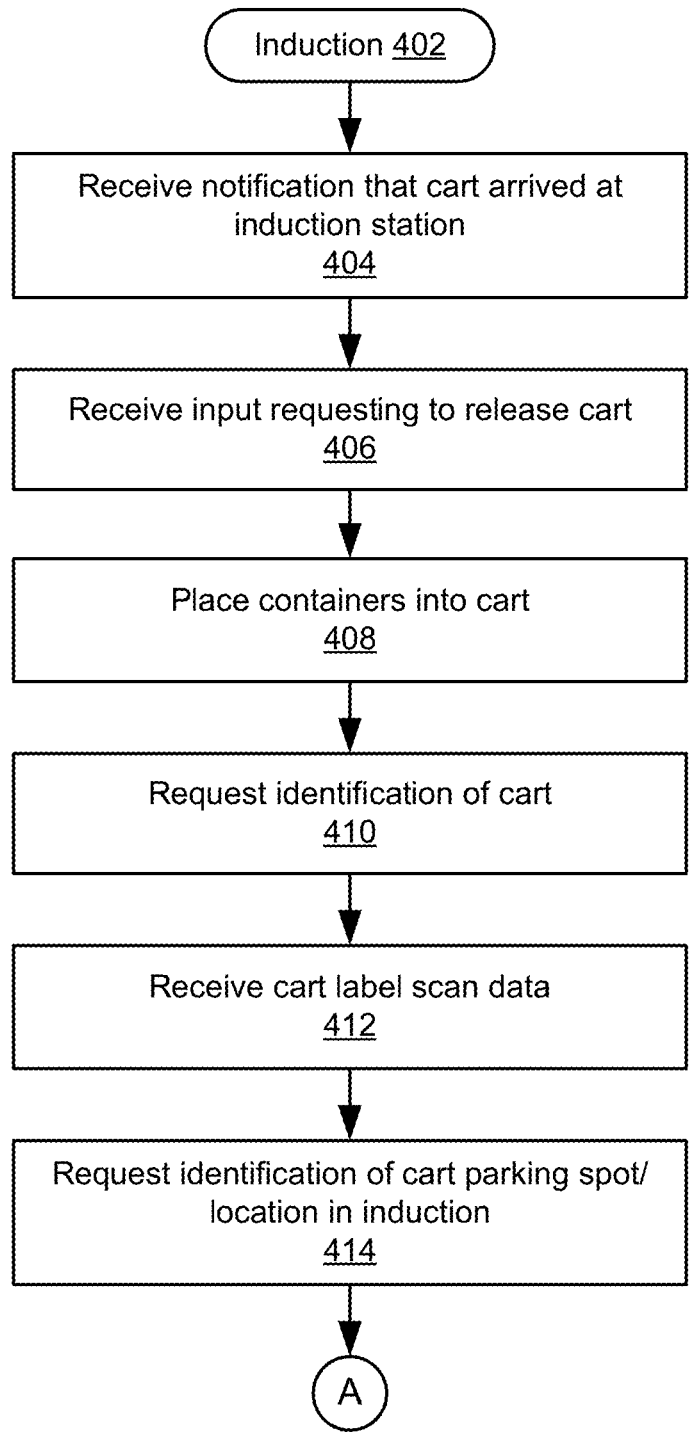
FIGS. 4A and 4B are a flowchart of an example method for inducting orders into the system.
Figure 4B:
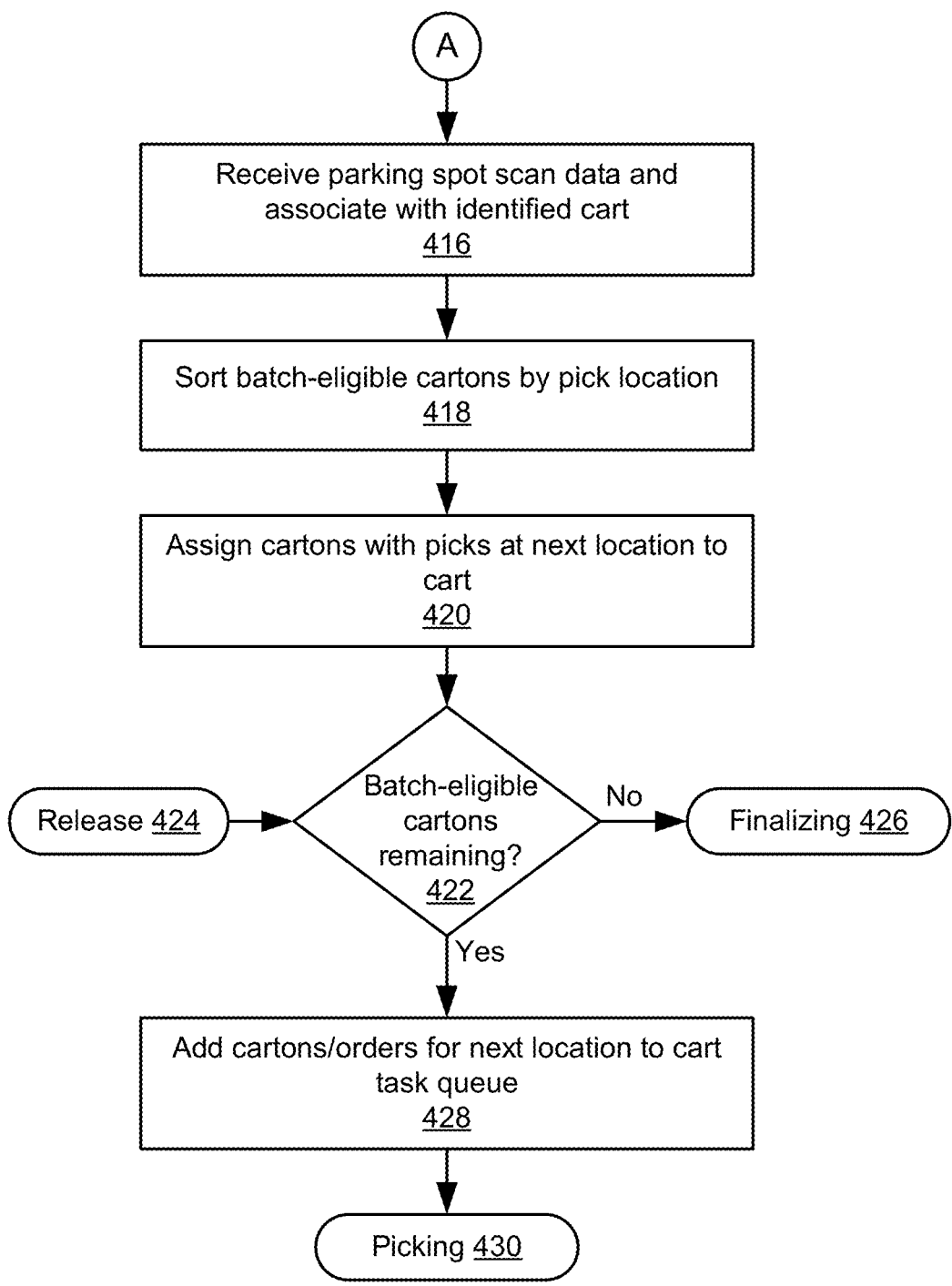

FIGS. 4A-4B illustrate a flowchart of an example method for inducting orders into the system 100. For instance, the system 100 may use the operations of the example in FIGS. 4A-4B to select locations, SKUs, or picks and/or launch carts, among other features. For example, the release logic engine may assign cartons, SKUs, or locations to a batch-picking cart. It should be noted that the operations of the method may be performed by various components of the system 100, such as the release logic engine 142.

At 402, the system 100 may start an induction flow and, at 404, the system 100 receive a notification that a cart has arrived at an induction station in the induction area 308. The notification may be based on a location (e.g., based on a beacon, scan, communication with cart computing device, or communication with a cart AGV 116) of the cart. In some instances, the notification may be based on a scan of the induction station and/or scan of the cart, which links the induction station to the particular cart. The induction station may be one of a plurality of stations or parking areas.

The system 100 may, at 406, receive input requesting to release the cart, for example, via a client device of a picker. For instance, the system 100 may select an available cart in an induction station for release.

In some implementations, at 408, the picker or an automated robot may place totes or other containers onto the cart to hold items. In some instances, an eligible batch-picking cart may be a cart with built in, permanently affixed, or already placed containers to hold items on the cart.

In some instances, at 410, the system 100 (e.g., a client device of the picking system 108) may output a message requesting identification of the cart, for example, in response to a confirmation of message indicating that containers are in the cart, that the cart is ready for release, and/or the release input at 406. For instance, the system 100 may receive, at 412, a scan of a label or other identifier (e.g., UPC, QR code, RFID, etc.) identifying the cart, for example, from a label reader of a client device. The cart label scan data may identify the cart or its availability/eligibility for a batch picking release (e.g., for the operation at 404, 406, or 410).

In some instances, the method may navigate back from 410 to 406 or repeat, for example, one or more of these operations.

The system 100 may, at 414, request identification of a cart parking spot, induction station, or other location of the cart in an induction area 308, for example, by a cart AGV 116 or picker client device. For instance, at 416, the system 100 may receive a parking spot scan data and associate the spot or other location with the identified cart. For instance, the system 100 may receive a scan of a QR code, RFID tag, etc., on a floor of the induction area 308 from a cart AGV 116 or picker client device. Other operations for identifying a location of the cart are possible, such as optical recognition, wireless beacon proximity, LIDAR, etc.

In some implementations, the system 100 (e.g., the REX server 132 or dispatch system 106) may use the location of the cart to navigate a cart AGV 116 to couple with the cart and/or compute a path of the cart to one or more assigned pick locations.

In some instances, the method may navigate back from 416 to 412 or repeat, for example, one or more of these operations.

At 418, the system 100 may sort orders (or individual cartons for fulfilling the orders) in the system 100 to determine those that are batch eligible (e.g., having only one SKU as described above) and/or by pick locations. For instance, the system 100 may determine those orders with items in the pick-to-cart area 302, determine the locations of each item, and sort the locations, for example, based on a path through the pick-to-cart area 302.

In some implementations, at 420, the system 100 may assign one or more cartons or orders with a pick at a next location to the cart. The system 100 may additionally or alternatively assign locations. For instance, a location may be determined based on whether the location is ahead of the cart along a path through the pick-to-cart area 302, balancing of cart workload(s), pick priority, or other factors. The system 100 may add the order or carton to the task queue of the cart. If the SKU or location is already assigned to the cart, a quantity of the SKU in the order may be added to the quantity of the SKU already assigned to the cart. As picks or locations are assigned to the carton, the system 100 may automatically generate a path or list of stops/locations in its task queue.

At 422, the system 100 may determine whether there are batch-eligible cartons or orders remaining to be assigned and/or picked. If there are no remaining eligible orders to be picked, the system 100 may direct the cart to proceed to finalizing at 426, for example, in the finalization area 314. In some instances, a release flow may start from 424.

If there are additional orders or cartons remaining, the system 100 may sort batch-eligible cartons by pick location and then add all the cartons for the next location to the cart, for example, to the task queue of the cart, at 428. In some instances, the system 100 may proceed, at 430, to picking, such as picking the items from the pick-to-cart area 302, as described below.

In some implementations, the system 100 may detect errors at various points of the method and output error messages, correct the errors, or repeat operations. For instance, after 406, the system 100 may determine whether sufficient cartons are available for a cart. After 412, the system 100 may determine whether the cart is still active, picks are remaining on the cart, the cart is not finalized, or the cart label does not match the mask. After 416, the system 100 may determine whether a parking spot or induction station does not exist or is not available for the cart. It should be noted that other automatic error detecting or mitigation operations are possible and contemplated herein.

Figure 5A:
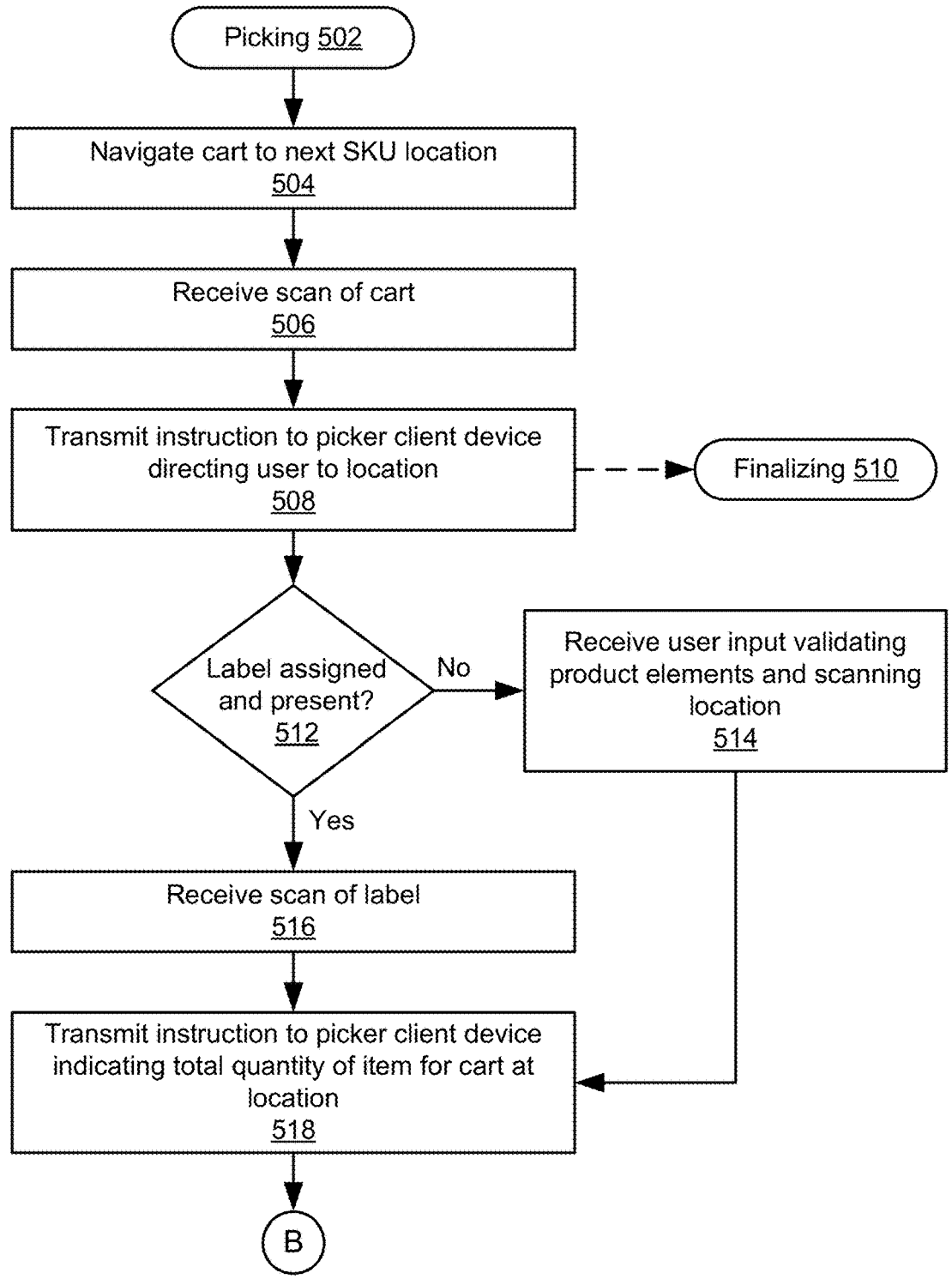
FIGS. 5A and 5B are a flowchart of an example method for picking SKUs to a batch-picking cart.
Figure 5B:
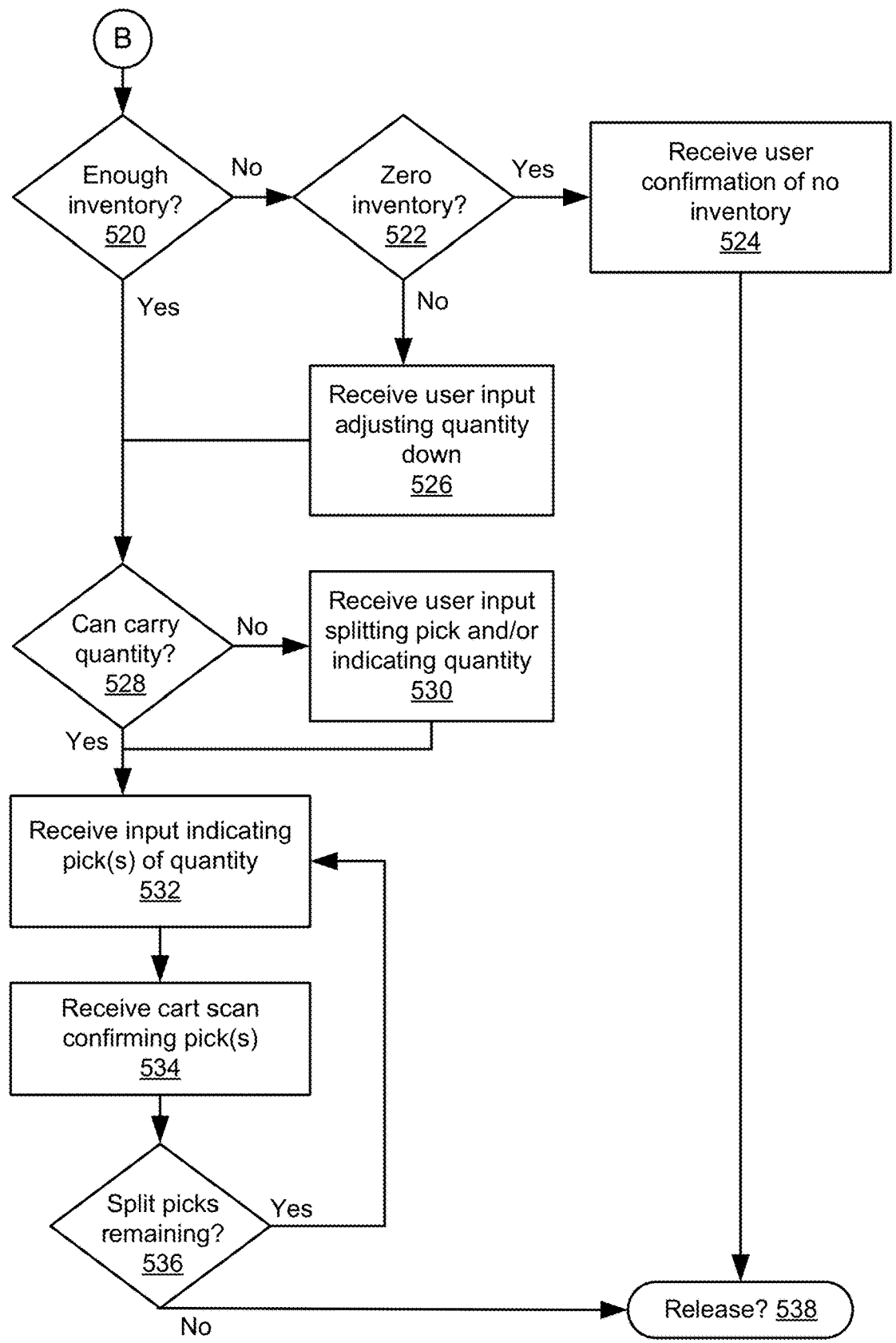

FIGS. 5A and 5B illustrate a flowchart of an example method for picking SKUs to a single-line batch-picking cart. It should be noted that the operations of the method may be performed by various components of the system 100, for example, the vision or picking system 108 may use the operations illustrated in FIGS. 5A and 5B to issue picking instructions, receive pick confirmations, and perform other operations shown.

At 502, the system 100 may start a picking flow and, at 504 may navigate the cart, such as using a cart AGV 116 or providing instructions to a client device for transporting the cart to a next location.

In some implementations, at 506, the system 100 may receive scan data of the cart, such as a label on the cart scanned by a picker client device. The scan of the cart may associate the cart with the picker client device, so that the particular picker client device receives certain instructions for performing various tasks and receiving various inputs (e.g., by automatically surfacing graphical user interfaces with instructions or input fields). In some instances, in response to receiving the scan of the cart, the system 100 may transmit instructions to the picker client device directing the user to the location and/or directing the user to pick a defined quantity of the item from the location at 508.

In some instances, if there are no picks remaining or if the user indicates that the cart is full or there is not enough room on the cart for the quantity of the item, the system 100 may move to a finalizing workflow at 510 and, for instance, instruct the cart to be transported to a finalization area 314, as noted elsewhere herein.

At 512, the system 100 may determine whether there is a label (e.g., a universal product code or UPC, an RFID, or other identifier) for the item that is assigned/associated with the item and physically present. For instance, if a picker indicates that they cannot find a UPC on the item, they may indicate, using a client device, that no UPC is present. The system 100 may, at 514, receive user input validating product elements (e.g., attributes identifying the item) and/or scanning the location to confirm the item. If the user or picking robot cannot validate or find the item, the system 100 may return to 504 or 508 to move to the next location.

At 516, the system 100 may receive an input identifying the item, for example, a scan of the label coupled with the item from a client device. The scan may be of a UPC, which the system 100 may associate (e.g., in a database, as described elsewhere herein) with a SKU identifier, order, or carton.

At 518, the system 100 may transmit an instruction to the picker client device indicating a total quantity of the item to pick to the cart at the location. For instance, if the cartons or orders assigned to the cart have a certain cumulative quantity, the picker client device may output the quantity for the picker to pick.

In some implementations, at 520, the system 100 may determine whether there is enough inventory for the quantity, for example, based the inventory levels indicated in a database or a picker input. If there is not sufficient inventory, the system 100 may determine whether there is any inventory of the item at 422, for example, at the location. If the system 100 determines that there is no inventory, it may receive user confirmation at 524 and move to the release or finalization flow at 538.

In some implementations, at 526, if there is some inventory but not sufficient for the total quantity, the system 100 may receive user input adjusting the pick quantity down. In some instances, the system 100 may automatically determine lower or minimum quantities for the item based on orders or cartons assigned to the cart. For instance, if a minimum quantity (e.g., 5 boxes of pens) of the SKU that are in any order assigned to the cart, the system 100 may allow, via a graphical user interface on the client device, the pick quantity may be reduced to either the minimum (e.g., 5 boxes of pens) or zero or any other increment based on quantities of the SKU in orders assigned to the cart. In some instances, the system 100 may reassign or defer picking of orders for which there is insufficient inventory.

In some implementations, at 528 the system 100 may determine whether the picker (or a carrying apparatus used by the picker) can carry the quantity of the item based on a threshold quantity of the item, a size of the item, or a user input. For instance, at 530, the system 100 may receive a user input splitting the pick and/or indicating of a quantity of to pick. For instance, the picker may indicate to split the pick of the total quantity into multiple picks of sub-quantities, as described in reference to FIG. 2.

At 532, the system 100 may receive an input (e.g., from the client device) indicating a pick of a sub-quantity of the item, for example, using a scan of the item and/or cart (e.g., a label or RFID tag thereon). For example, at 534, the system 100 may receive a cart scan confirming that the pick of the sub-quantity to the item.

At 536, the system 100 may determine whether there are any split picks, sub-quantities, or remaining items of a given SKU to pick from the location. The system 100 may repeat the split picks until the items have been picked. For instance, if 32 packages of Brand-X blue pens are assigned to the cart, the user may split the picks into groups of 10 and the system 100 may instruct the user to pick 10, 10, 10, and 2 (or an equal or relatively equal division less than the quantity, such as 4 picks of 8). The system 100 may confirm each split pick.

If there are no additional split picks, the system 100 may proceed to release, at 538, the cart to a next location, to receive a newly assigned location (or carton or order), or release the cart to finalizing.

In some implementations, the system 100 may detect errors at various points of the method and output error messages, correct the errors, or repeat operations. For instance, after 506, the system 100 may determine whether the cart is still being built in the system 100 or is not yet built, if there are no picks, or if the location is already assigned. After 514, the system 100 may determine whether an item is at the wrong location. After 516, the system 100 may determine whether an incorrect label was scanned or if the scan does not match the SKU identifier. After 534, the system 100 may determine whether the cart scanned is an incorrect or wrong cart. It should be noted that other automatic error detecting or mitigation operations are possible and contemplated herein.

Figure 6A:
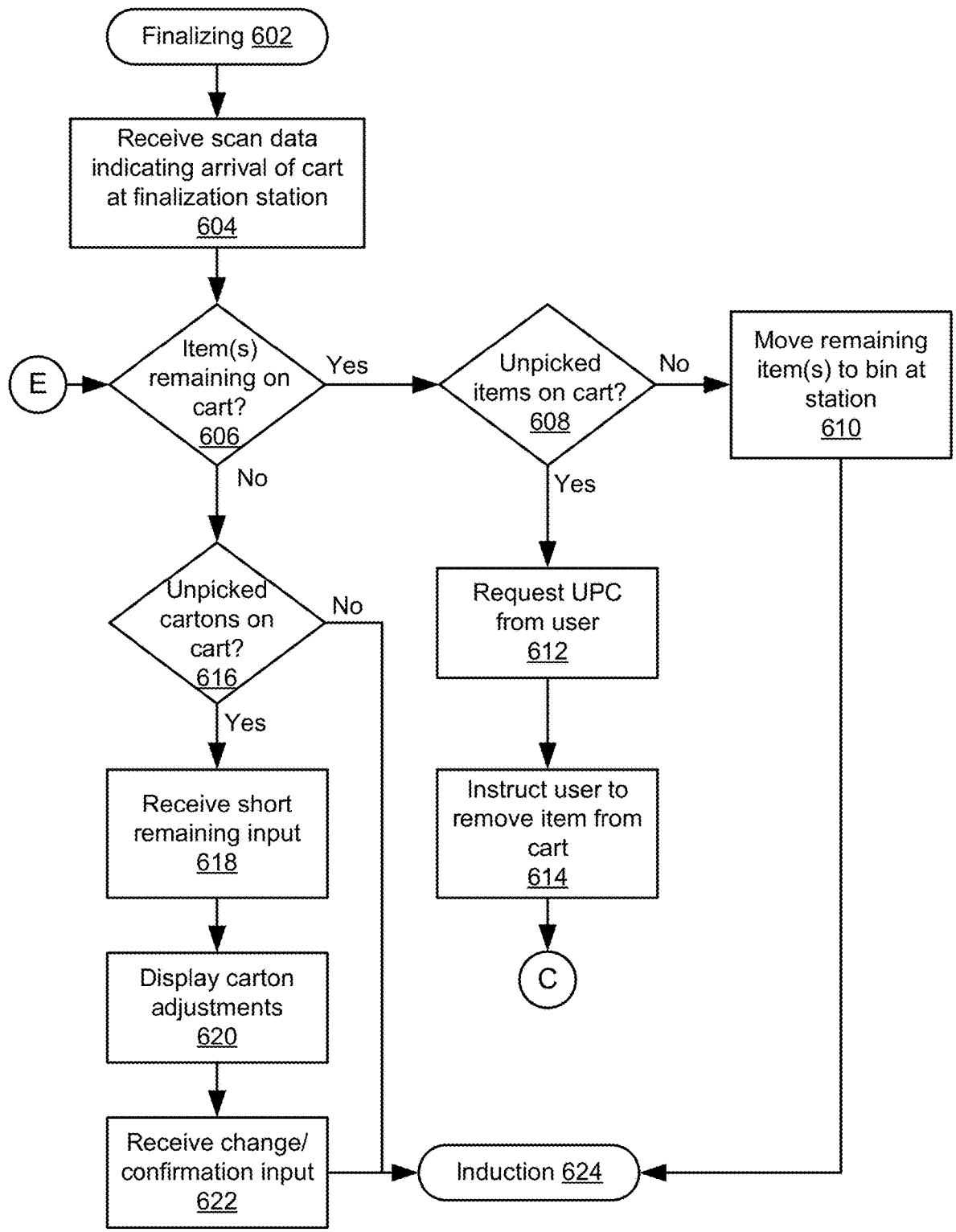
FIGS. 6A-6C are a flowchart of an example method for finalizing one or more cartons using a batch-picking cart.
Figure 6B:
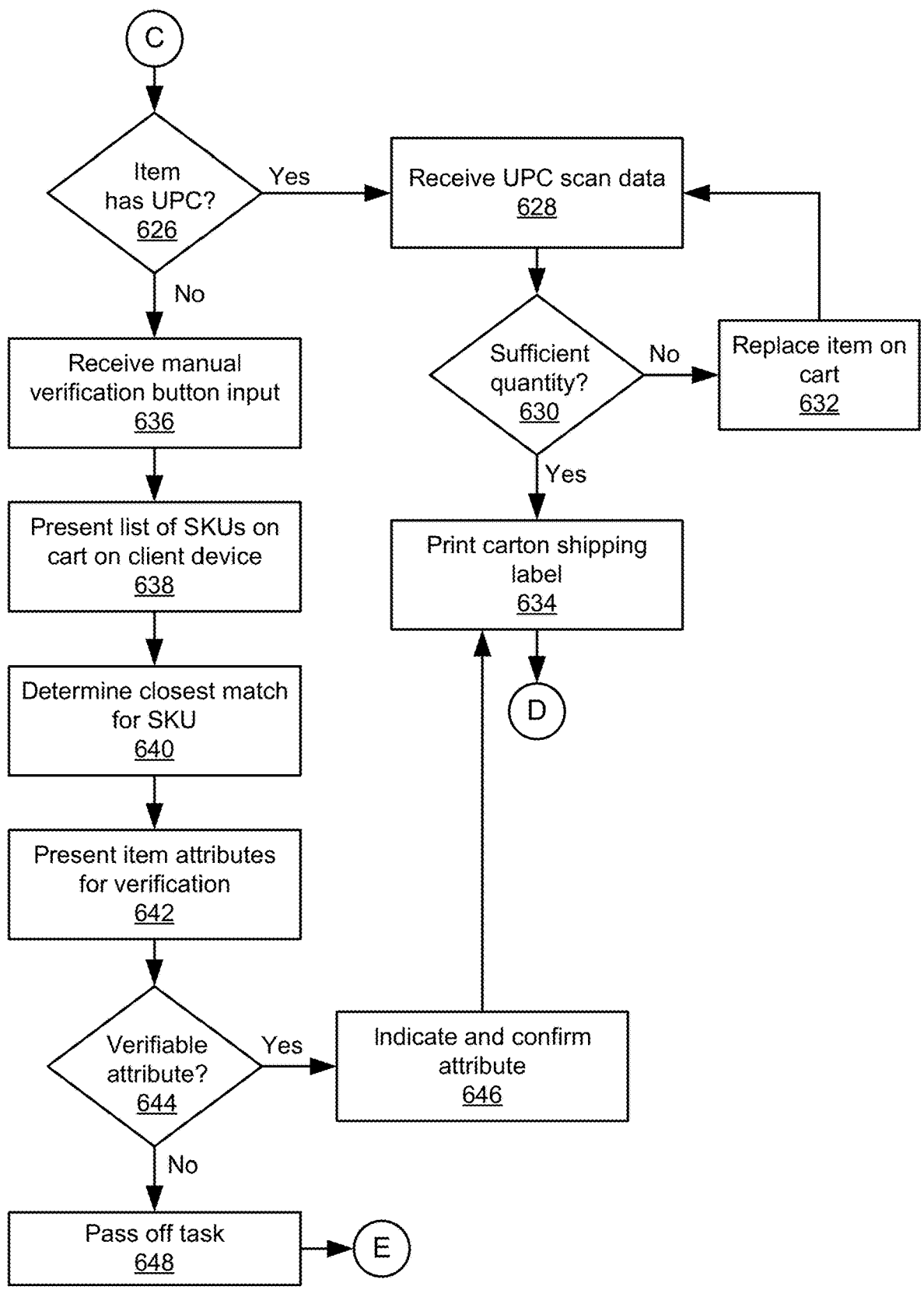
Figure 6C:
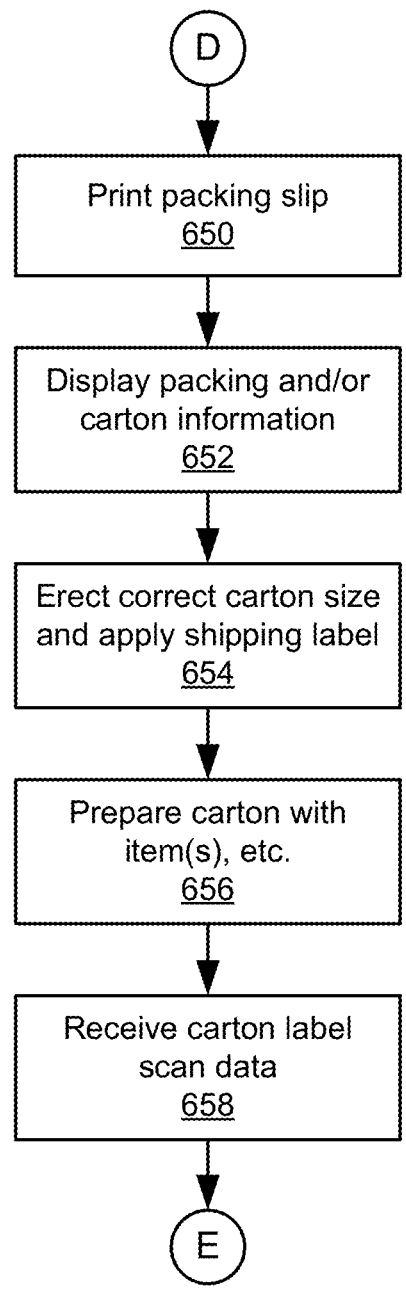

FIGS. 6A-6C illustrate a flowchart of an example method for finalizing cartons using a batch-picking cart. It should be noted that the operations of the method may be performed by various components of the system 100, for example, the vision or picking system 108 may use the operations illustrated in FIGS. 6A-6C to pick items from the batch-picking cart and place them into cartons.

At 602, the system 100 may start a finalizing flow, for example, at 604, the system 100 may receive scan data indicating arrival of the cart at the finalization station. At 606, the system 100 may determine whether there are any items on the cart, for example, which have been picked to the cart and/or are remaining on the cart. For instance, at 608, the system 100 may determine whether there are unpicked cartons or orders (e.g., orders with items) remaining on the cart.

At 610, if there aren't remaining items for cartons on the cart, the system 100 may instruct a user (e.g., by transmitting instructions to a client device at the finalization station) to move remaining item(s) to a separate bin at the finalization station, for example, to be replaced in the pick-to-cart area 302, picked manually, or another action performed thereon.

In some implementations, at 612, if there are items on the cart (e.g., determined based on a user input indicating such) for unpicked cartons, the system 100 may request a scan of a label of the item, such as of a UPC on the item, from the user via the client device. At 614, the system 100 may instruct the user to remove the item(s) from the cart and, in some instances, proceed to 626.

In some implementations, if there are no items remaining on the cart, at 616, the system 100 may determine whether there are unpicked carton assigned to the cart, for example, if there are cartons assigned to the cart for which there are insufficient items on the cart. If there are no unpicked cartons, the system 100 may proceed to an induction flow, for example, by navigating the cart back to an induction station.

If there are insufficient items on the cart, the system 100 may receive, at 618, a "short remaining" input from the user indicating that there are not enough of an item with a given SKU identifier. The system 100 may, at 620, display carton adjustments, for example, the REX 132 may display a graphical user interface that presents a list of carton adjustments that may be made. For instance, the system 100 may ship a carton with fewer than an ordered quantity, pick another item from the pick-to-cart area 302, or request manual correction of the order from a human picker. At 622, the system 100 may receive a change or confirmation input indicating that the adjustments have been made, for example, by changing the order or correcting the pick. The method may then proceed to an induction flow at 624.

In some implementations, at 626, the system 100 may determine whether the item has a label (e.g., in the same way or based on the above-noted determination), such as a UPC. If there is a label, the system 100 may receive UPC/label scan data at 628. In some instances, at 630, the system 100 may determine whether there are a sufficient quantity of the item for an order (e.g., determining an order with a certain quantity) and, if there are a sufficient quantity, the system 100 may print a carton shipping label at 634 and/or proceed to 650. If there aren't sufficient quantity, the system 100 may direct, at 632, a user to replace an item on the cart, for example, for a smaller order or error handling.

If the system 100 determines, at 626, that there isn't a label or UPC on the item, the system may receive input from the user, for example, via a graphical user interface on a picker device, such as on a manual verification button at 636. In response, the system 100 may present a list of SKUs or attributes thereof (e.g., titles, colors, sizes, images, etc.) on the client device at 638.

At 640, the system 100 may determine a closest match for the SKU, for example, based on user input selecting the SKU from the presented list. In some implementations, the system 100 may display, at 642, item attributes for verification, for example, by asking whether a product has a certain color, shape, brand, etc. At 644, the system 100 may determine whether the attribute has been verified, such as, when a user indicates and/or confirms the attribute at 646 thereby confirming its identity.

In some implementations, if the item cannot be identified or matched to an order in the cart, such as when it was accidentally picked, the system 100 may automatically pass off the pick task for that item or order to a specialized picker for error or manual handling at 648. In some instances, the method may proceed to a next item, for example, at 606.

At 650, the system 100 may print a packing slip for a carton, if needed. For instance, the system 100 may identify an order associated with the scanned item, retrieve packing slip and/or shipping data, and automatically communicate a printer at the finalization station to print the packing slip. In some instances, the printer may be placed over an open shipping carton into which prints may automatically fall when the print is complete. In some implementations, other documents such as hazard stickers, advertisements, or other information may be printed and/or provided for the carton based on the identification of the order.

At 652, the system 100 may display, on a client device, packing and/or carton information instructing the user how to prepare a carton, place the item into the cart, which documentation to place on or in the cart, or other instructions. At 654, the user may build a carton and apply a shipping label for the order, for example, based on the instructions. In some instances, a shipping carton building machine may automatically build and/or label a carton.

At 656, the picker or a robot may place the item(s) into the carton and, at 658, the system 100 may receive carton label scan data, for example, from the client device. The carton label scan data may confirm completion of the carton. In some instances, the system 100 may proceed to process the next item, for example, at 604.

In some implementations, the system 100 may detect errors at various points of the method and output error messages, correct the errors, or repeat operations. For instance, after 604, the system 100 may determine whether the cart is active, complete, or is the wrong cart. After 628, the system 100 may determine whether the UPC is not present on the particular cart, no more cartons are the particular SKU identifier are on the cart, or that a carton/order has been canceled. After 658, the system 100 may determine if there are any problems with the carton, such as an incorrect size or configuration.

Figure 7A:
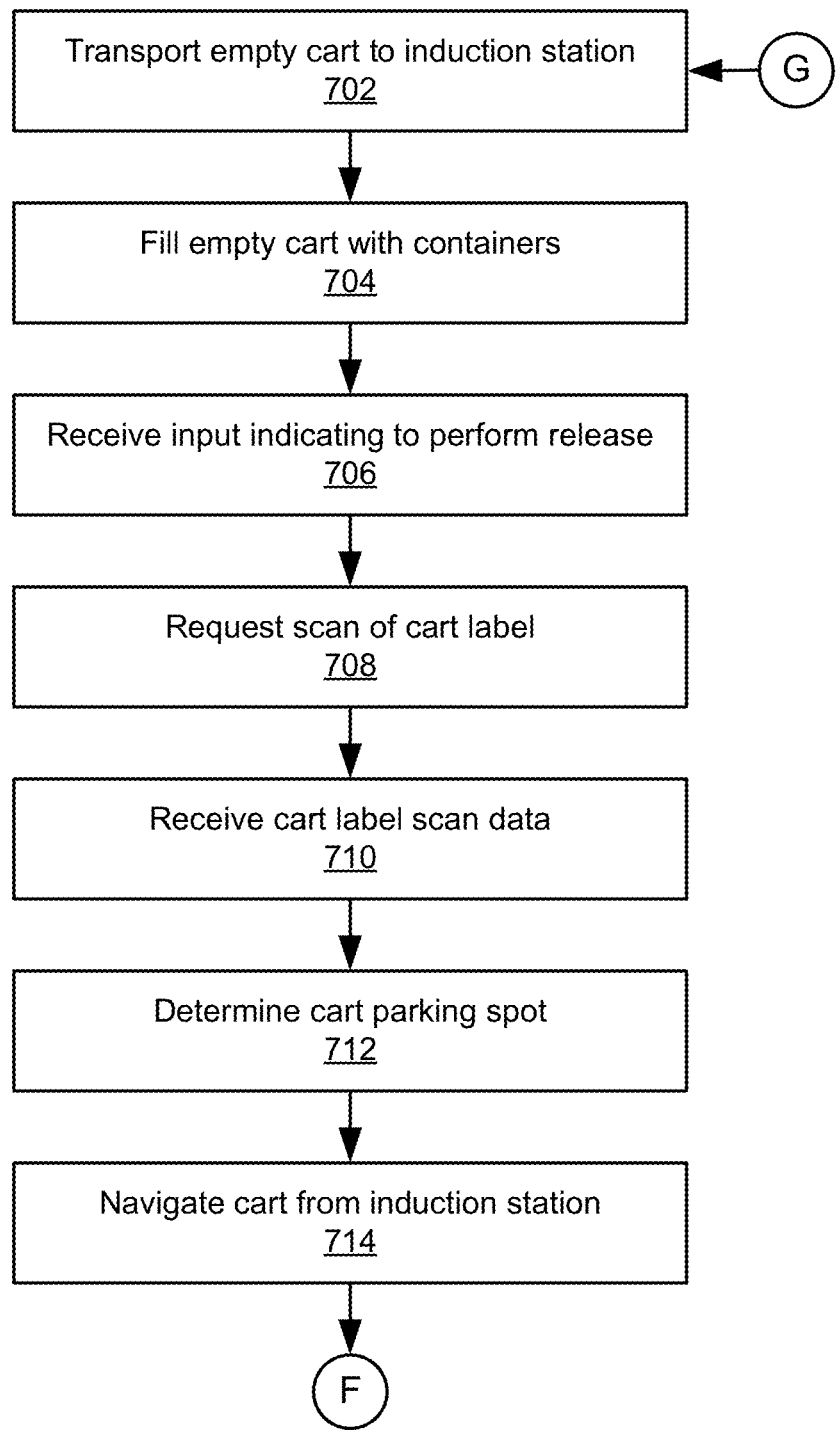
FIGS. 7A and 7B are a flowchart of an example method for assigning cartons to the cart.
Figure 7B:
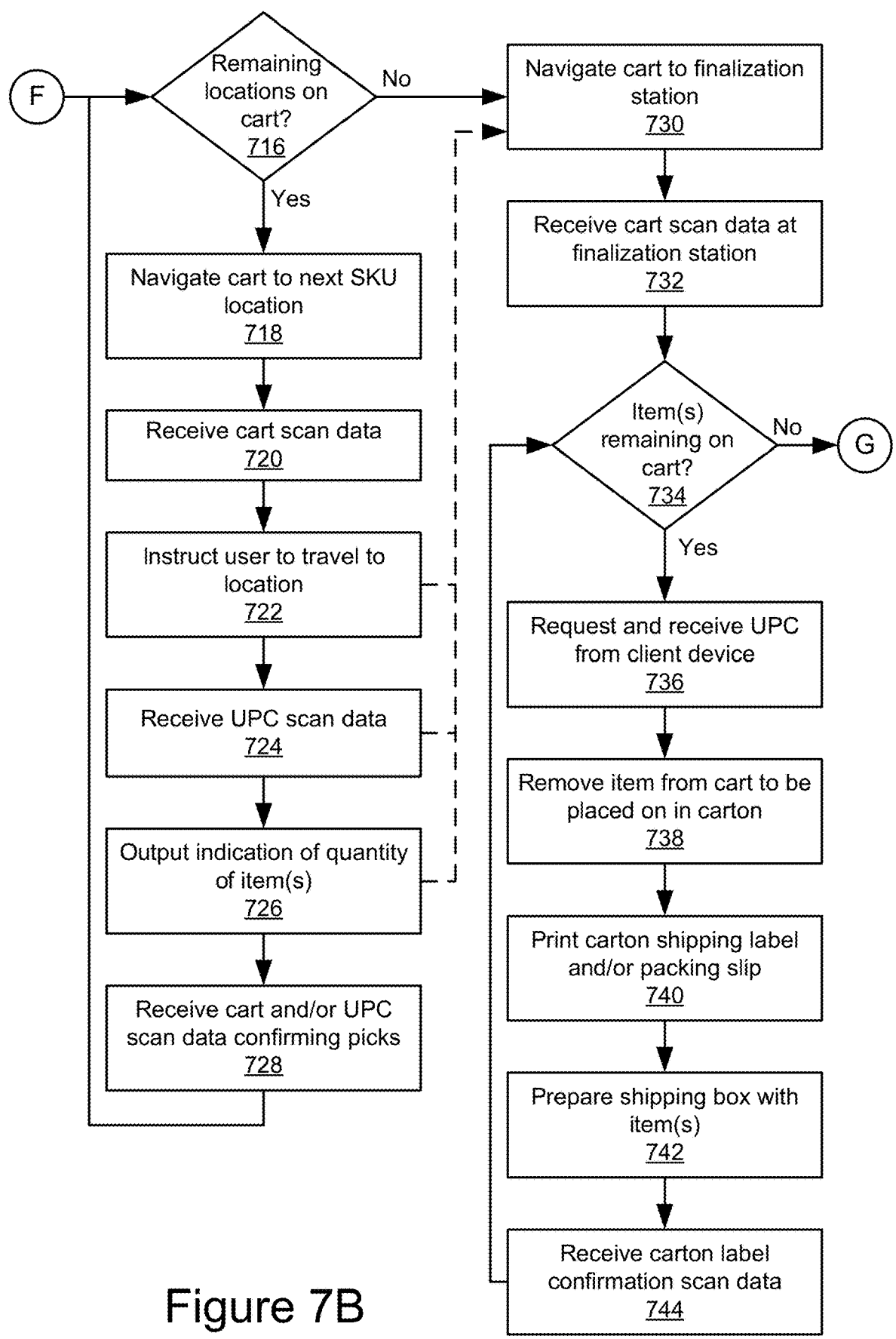

FIGS. 7A-7B illustrate a flowchart of an example method for assigning cartons to the cart. The system 100 may use the operations illustrated in FIGS. 7A-7B to select and assign cartons, SKUs, and/or locations to a batch-picking cart. Some of the operations of FIGS. 7A-7B are described in further detail above, for example, in reference to FIG. 2, so their description here is abbreviated.

At 702, the system 100 may transport an empty cart to an induction station, for example, using a cart AGV 116. At the induction station, the cart may be filled with containers on which items may be transported at 704. In some instances, at 706, the system 100 may receive input instructing the system 100 to perform a release.

In some implementations, at 708, the system 100 may request a scan of a cart label, for instance, to confirm identity of the cart and/or its availability for release for batch picking. At 710, the system 100 may receive the cart label scan data identifying the cart. In some instances, at 712, the system 100 may determine a cart parking spot at which the cart is located and, for example, based on the parking spot and/or identification of the cart (and an associated cart AGV 116 or computing device for communication), navigate the cart from the induction or build station at 714.

In some implementations, at 716, the system 100 may determine whether there are remaining locations assigned to the cart and, if there are remaining locations, navigate the cart to the next SKU location at 718. At 720, the system 100 may receive cart scan data identifying the cart and, at 722, instruct a user to travel to the location of an item in the pick-to-cart area 302.

In some implementations, at 724, the system 100 may receive label or UPC scan data identifying the item and, at 726, output identification of a quantity of items with the UPC or SKU identifier assigned to the order and/or cart. At 728, the system 100 may receive cart and/or UPC scan data confirming the picks, for example, to confirm that the items are placed into the correct cart. Once the pick at the location is complete, the method may return to 716 for a next location for a next pick in a task queue of the cart.

At 730, in some instances, if there are no remaining locations assigned to the cart, the system 100 may proceed to navigate the cart to a finalization station in the finalization area 314. In some instances, at any point during the picking process (e.g., at 722, 724, or 726), the system 100 may determine (e.g., based on defined cart capacity or user input) that a cart is full and may cease picking or assigning locations and navigate the cart to finalization.

In some implementations, at 732, the system 100 may receive cart scan data identifying the cart and/or its presence at the finalization station. The system 100 may determine, at 734, whether there is an item remaining on the cart. If there are no remaining items on the cart, the method may proceed to the operation at 702 to return the cart to the induction area 308.

In some implementations, at 736, the system 100 may request and/or receive item identification, such as a UPC scan, from a client device at the finalization station. The identified item may be removed from the cart to be placed in the carton at 738. At 740 and 742, the system 100 may print a carton shipping label and/or packing slip and prepare a shipping box with the item(s). In some instances, the system 100 may receive carton label confirmation scan data confirming that the carton is prepared with the item at 744.

Figure 8:
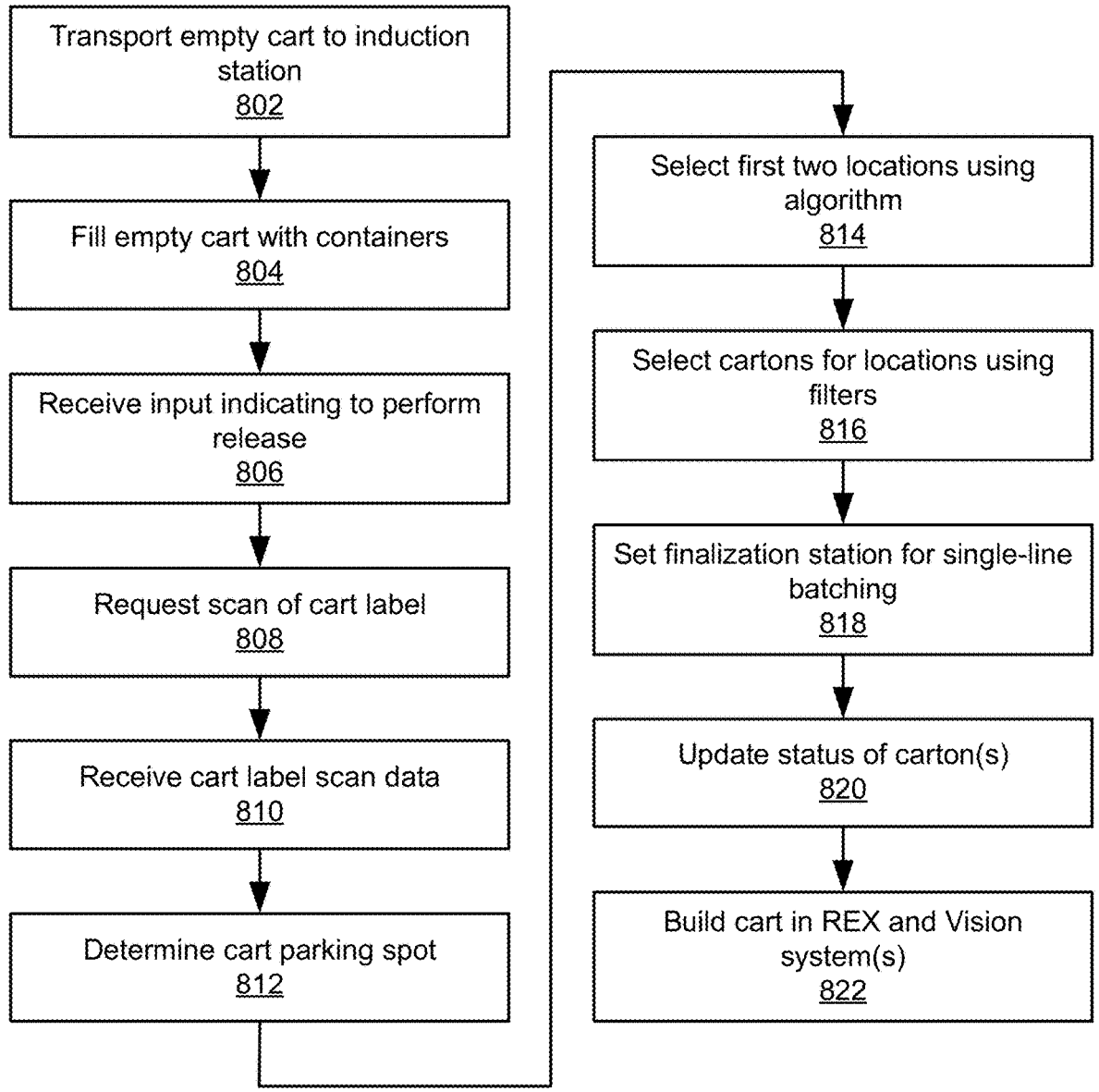
FIG. 8 is a flowchart of an example method for dynamically assigning cartons to the cart.

FIG. 8 illustrates a flowchart of an example method for dynamically assigning cartons to the cart. Some of the operations of FIG. 8 are described in further detail above, for example, in reference to FIG. 2, so their description here is abbreviated.

In some implementations, at 802, the system 100 may transport an empty carto to an induction station, and, at 804, may fill the empty cart with containers or totes. At 806, the system 100 may receive input indicating to perform a release, for example, of a batch-picking cart. The system 100, at 808 and 810 may request and receive a label scan or other identification of the cart. The system 100 may, at 812, determine a parking spot or other location for the cart, for example, in the induction area 308.

In some implementations, at 814, the system 100 may select two locations in the pick-to-cart area 302, for example, using a filtering algorithm. For instance, the system 100 may filter out orders based on whether their quantity of SKUs satisfy a threshold, whether they have picks outside the pick-to-cart area 302, whether they have replenishment holds, whether they are batch eligible, whether the quantity of items in the order satisfy a threshold, based on their attributes, how quickly they need to be picked (e.g., a cut time), or other factors. The system 100 may select locations with SKUs to be picked, for instance, based on one or more of these filters 816.

In some implementations, at 818, the system 100 may set a finalization station for single-line batching, for instance, for receiving a batch-picking cart. For example, the finalization station may be configured to perform operations described in reference to FIGS. 6A-6C.

The system 100 may update the status of cartons, for example, to be finalized at the finalization station, at 820. In some implementations, at 822, the system 100 may build the cart, for example, the system 100 may assign tasks to the cart, assign pickers to the cart, or perform other operations, such as those described in reference to FIGS. 2-9 herein. For instance, the cart may be configured in the REX 132, picking system 108, or other component(s) of the system 100.

Figure 9:
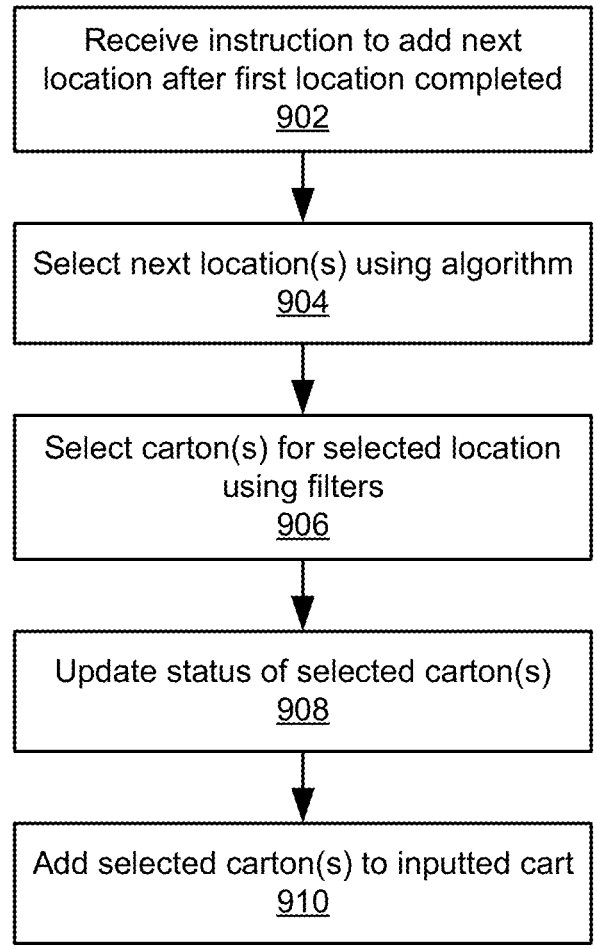
FIG. 9 is a flowchart of an example method for using the release logic engine to add locations, for example, to a cart's task queue.

FIG. 9 illustrates a flowchart of an example method for using the release logic engine to add locations, for example, to a cart's task queue. Some of the operations of FIG. 9 are described in further detail above, so their description here is abbreviated.

In some implementations, at 902, the system 100 may receive an instruction add a next location, for example, after a pick at a first location has been completed. At 904, the system 100 may select one or more next locations, for instance, using a filtering algorithm, as described in reference to FIG. 8.

At 906, the system 100 may select cartons or orders that have items stored at the selected location. In some instances, the system 100 may select the cartons/orders based on other criteria, such as that described above. For instance, cartons or orders may be selected based on how soon they need to be picked, an order in which they were received, or other filtering criteria.

The system 100 may update a status of the selected carton(s) or order(s), for instance, to indicate that they are assigned to the cart, at 908. In some instances, the system 100 may add the select carton(s), order(s), or associated task(s) to a task queue of a cart. For instance, the selected order, its SKU identifier(s), and/or the selected location(s) may be assigned, at 910, to a cart that is already navigating through the pick-to-cart area 302.

Figure 10A:
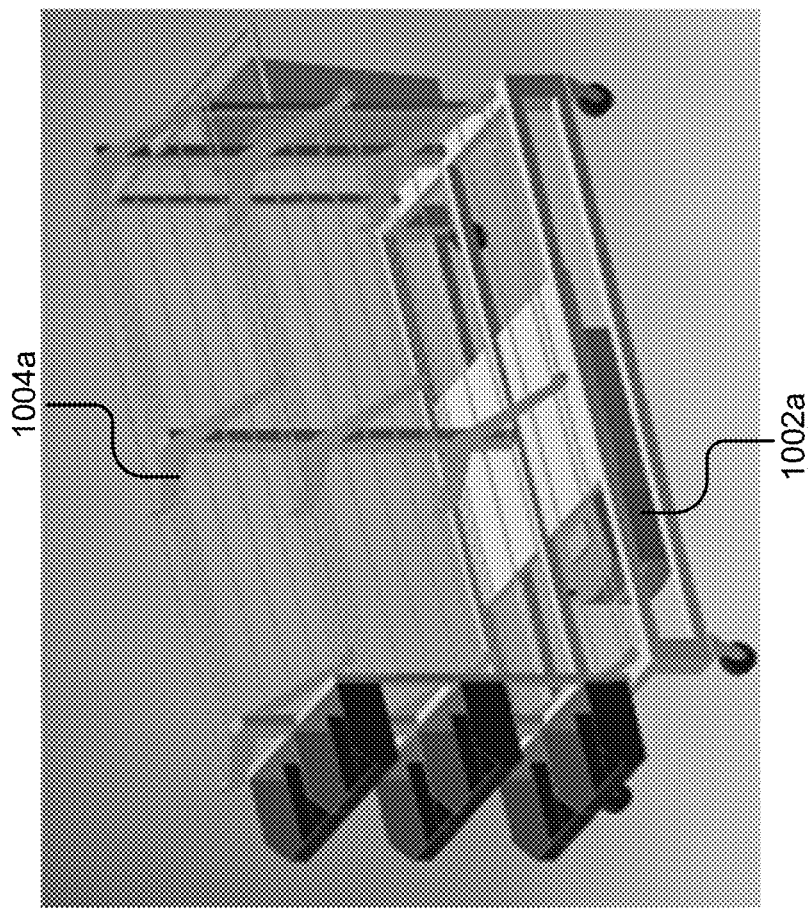
FIGS. 10A and 10B are illustrations of example cart AGVs.
Figure 10B:
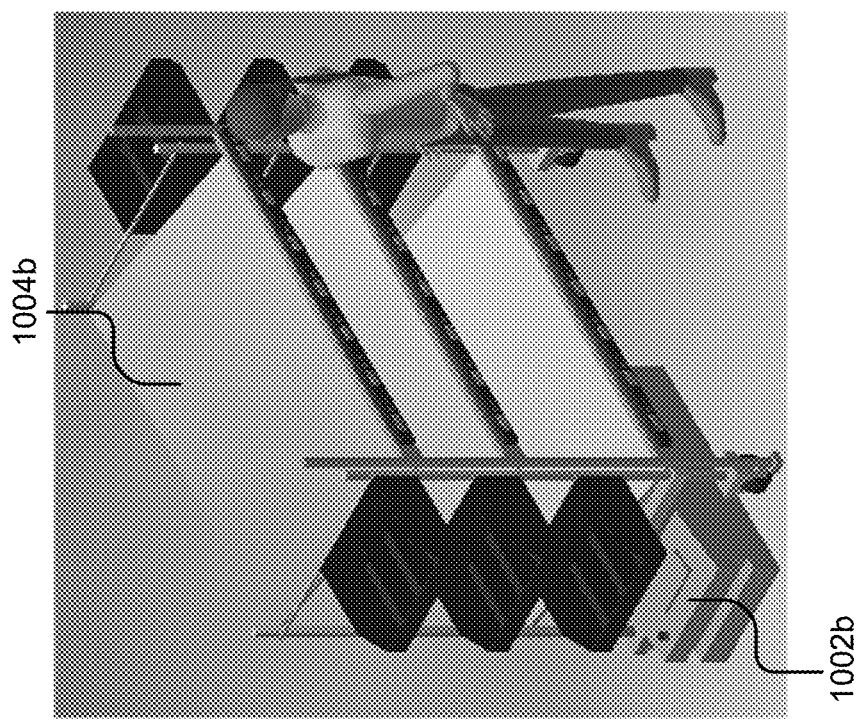

FIGS. 10A and 10B are illustrations of example cart AGVs 1002a and 1002b (e.g., also referred to herein as 116). The examples may include a cart AGV 1002 or robot configured to autonomously transport pick-to-cart items, as described above. The cart AGV 1002 may include or be adapted to autonomously transport a carton holder 1004a or 1004b (e.g., a cart or shelves) that is adapted to hold cartons (not shown in FIG. 10A or 10B). For example, a cart AGV 1002 may push/pull a carton holder 1004. In some implementations, a carton may be a box placed on a shelf of the carton holder 1004.

As illustrated in FIGS. 10A and 10B, the cart AGV 1002 may include a substantially rectangular body and may include or be couplable to a connectable cart having shelves, such as the carton holder 1004a or 1004b. The cart AGV 1002 may couple to a connectable cart via a coupling mechanism and matching coupling component, for example, a latch mechanism coupling the cart AGV 1002 to the connectable cart. In some instances, the shelves may be angled for easy loading of cartons to be filled with picked items.

In some implementations, the cart AGV 1002 may also include a guidance system that may detect, for instance, a human picker associated with the cart AGV 1002 (e.g., via a tracking device on the picker, optical recognition, etc.), determine the picker's position, and reposition itself automatically based on the picker's position by comparing the cart AGV's 1002 position and the picker's position, and a pre-determined offset (e.g., a distance in front of, behind, and/or next to the picker). This advantageously allows the cart AGV 1002 to follow the picker.

The cart AGV 1002 may include drive units that move the cart AGV 1002 in an operating environment. Although other implementations are possible, the drive unit may include turn tables each with one or more drive motors. For instance, the cart AGV 1002 may include two turn tables, each of which may include one or more drive motors coupled to one or more wheels, tracks, treads, etc. The turntables may be motorized to allow them to rotate. The turntables may allow the cart AGV 1002 to maneuver along any horizontal trajectory (e.g., forward, backward, sideways, rotate, etc.)

Figure 11:
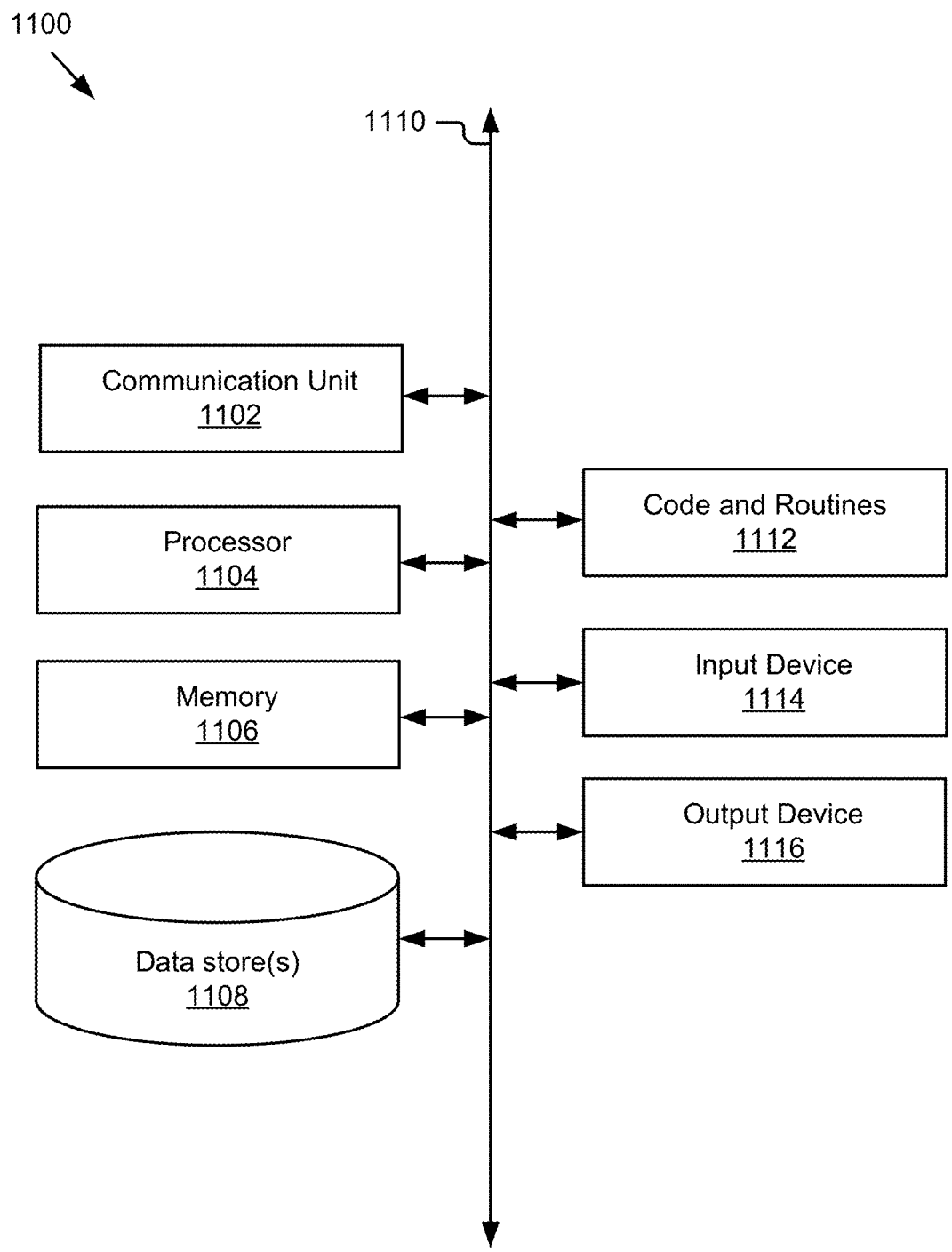
FIG. 11 is a block diagram illustrating an example computing system.

FIG. 11 is a block diagram illustrating an example computing system 1100. The example computing system 1100 may correspond to a WES 102, a WMS 104, a dispatch system 106, a picking system 108, or a REX 132, a client device, or a component of the system 100, for example.

The code and routines 1112 may include computer logic executable by the processor 1104 on a computing system 1100 to provide for the functionality described in reference to one or more of the components of the system 100. For instance, in some implementations, the release logic engine 142 may include code and routines.

As depicted, the computing system 1100 may include a processor 1104, a memory 1106, a communication unit 1102, an output device 1116, an input device 1114, and database(s) 1108, which may be communicatively coupled by a communication bus 1110. The computing system 1100 depicted in FIG. 11 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 1100 may include various operating systems, sensors, additional processors, and other physical configurations. Although, for purposes of clarity, FIG. 11 only shows a single processor 1104, memory 1106, communication unit 1102, etc., it should be understood that the computing system 1100 may include a plurality of one or more of these components.

The processor 1104 may execute software instructions by performing various input, logical, and/or mathematical operations. The processor 1104 may have various computing architectures to method data signals including, for example, a complex instruction set computer (CISC) architecture, a reduced instruction set computer (RISC) architecture, and/or an architecture implementing a combination of instruction sets. The processor 1104 may be physical and/or virtual, and may include a single core or plurality of processing units and/or cores. In some implementations, the processor 1104 may be capable of generating and providing electronic display signals to a display device, supporting the display of images, capturing and transmitting images, performing complex tasks including various types of feature extraction and sampling, etc. In some implementations, the processor 1104 may be coupled to the memory 1106 via the bus 1110 to access data and instructions therefrom and store data therein. The bus 1110 may couple the processor 1104 to the other components of the computing system 1100 including, for example, the memory 1106, the communication unit 1102, the input device 1114, the output device 1116, and the database(s) 1108.

The memory 1106 may store and provide access to data to the other components of the computing system 1100. The memory 1106 may be included in a single computing device or a plurality of computing devices. In some implementations, the memory 1106 may store instructions and/or data that may be executed by the processor 1104. For example, the memory 1106 may store the code and routines 1112. The memory 1106 is also capable of storing other instructions and data, including, for example, an operating system, hardware drivers, other software applications, databases, etc. The memory 1106 may be coupled to the bus 1110 for communication with the processor 1104 and the other components of computing system 1100.

The memory 1106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 1104. In some implementations, the memory 1106 may include one or more of volatile memory and non-volatile memory (e.g., RAM, ROM, hard disk, optical disk, etc.). It should be understood that the memory 1106 may be a single device or may include multiple types of devices and configurations.

The bus 1110 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1102 may include one or more interface devices (I/F) for wired and wireless connectivity among the components of the system 100. For instance, the communication unit 1102 may include various types known connectivity and interface options. The communication unit 1102 may be coupled to the other components of the computing system 1100 via the bus 1110. The communication unit 1102 may be electronically communicatively coupled to a network (e.g., wiredly, wirelessly, etc.). In some implementations, the communication unit 1102 can link the processor 1104 to a network, which may in turn be coupled to other processing systems. The communication unit 1102 can provide other connections to a network and to other entities of the system 100 1100 using various standard communication protocols.

The input device 1114 may include any device for inputting information into the computing system 1100. In some implementations, the input device 1114 may include one or more peripheral devices. For example, the input device 1114 may include a keyboard, a pointing device, microphone, an image/video capture device (e.g., camera), a touch-screen display integrated with the output device 1116, etc.

The output device 1116 may be any device capable of outputting information from the computing system 1100. The output device 1116 may include one or more of a display (LCD, OLED, etc.), a printer, a 3D printer, a haptic device, audio reproduction device, touch-screen display, etc. In some implementations, the output device is a display which may display electronic images and data output by the computing system 1100 for presentation to a user, such as a picker or associate in the order fulfillment center. In some implementations, the computing system 1100 may include a graphics adapter (not shown) for rendering and outputting the images and data for presentation on output device 1116. The graphics adapter (not shown) may be a separate processing device including a separate processor and memory (not shown) or may be integrated with the processor 1104 and memory 1106.

The database(s) are information source(s) for storing and providing access to data. The data stored by the database(s) 1108 may be organized and queried using various criteria including any type of data stored by them, such as the data in the data store 120 and other data discussed herein. The database(s) 1108 may include file systems, data tables, documents, databases, or other organized collections of data. Examples of the types of data stored by the database(s) 1108 may include the data described herein, for example, in reference to the data store 120.

The database(s) 1108 may be included in the computing system 1100 or in another computing system and/or storage system distinct from but coupled to or accessible by the computing system 1100. The database(s) 1108 can include one or more non-transitory computer-readable mediums for storing the data. In some implementations, the database(s) 1108 may be incorporated with the memory 1106 or may be distinct therefrom. In some implementations, the database(s) 1108 may store data associated with a database management system (DBMS) operable on the computing system 1100. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system 100 either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   receiving, by one or more processors, data describing a set of orders, the set of orders including one or more items having one or more stock keeping unit (SKU) identifiers associated with the one or more items;
   sorting, by the one or more processors, the set of orders into a subset of orders based on each order of the subset of orders consisting of a single variety of SKU identifier;
   identifying, by the one or more processors, a first cart for batch picking;
   assigning, by the one or more processors, a first location in a pick-to-cart area to a task queue of the first cart based on a first item having a first SKU identifier being located at the first location and a first order of the subset of orders including the first SKU identifier;
   navigating, by the one or more processors, the first cart to the first location in the pick-to-cart area;
   instructing, by the one or more processors, a picker to pick the first item having the first SKU identifier at the first location;
   receiving, by the one or more processors, one or more confirmation inputs indicating completion of a pick of the first item having the first SKU identifier to the first cart; and
   navigating, by the one or more processors, the first cart to an end point.

2. The computer-implemented method of claim 1, further comprising:
   receiving, by the one or more processors, after dispatching the first cart, order data representing a second order, the second order including a second SKU identifier;
   determining, by the one or more processors, a second location at which a second item having the second SKU identifier is located;
   determining, by the one or more processors, that the second location is located after the first location on a path of the first cart; and
   in response to the second location being located after the first location on the path of the first cart, assigning the second location to the task queue of the first cart and transmitting a second pick instruction to one or more client devices associated with the picker, the second pick instruction indicating a second quantity of the second item having the second SKU identifier.

3. The computer-implemented method of claim 1, wherein receiving the set of orders includes:
   receiving, by the one or more processors, first order data representing an initial set of orders, the first order data indicating SKU identifiers included in the initial set of orders; and
   sorting, by the one or more processors, the initial set of orders into the set of orders based on the SKU identifier in each order.

4. The computer-implemented method of claim 1, further comprising:
   receiving, by the one or more processors, scan data from one or more client devices, the first cart being identified using the scan data;
   determining, by the one or more processors, a current location of the first cart in a fulfillment center; and
   dispatching, by the one or more processors, the first cart from the current location.

5. The computer-implemented method of claim 1, wherein assigning the first location to the task queue of the first cart includes:
   determining, by the one or more processors, the first location based on a location at which the first item having the first SKU identifier is stored in the pick-to-cart area.

6. The computer-implemented method of claim 1, wherein navigating the first cart to the first location includes:
   instructing, by the one or more processors, an automated guided vehicle to move the first cart, the automated guided vehicle having a drive unit adapted to propel the automated guided vehicle, a guidance system adapted to locate the automated guided vehicle in the pick-to-cart area, and a controller adapted to receive instructions and transport the first cart using the drive unit and the guidance system based on the instructions, the first cart being adapted to hold a plurality of items; and
   providing, by the automated guided vehicle, motive force to the first cart to propel the first cart to the first location.

7. The computer-implemented method of claim 1, wherein receiving the one or more confirmation inputs includes:
   receiving, by the one or more processors, item scan data from one or more client devices, the item scan data identifying the first SKU identifier of the first item; and
   receiving, by the one or more processors, cart scan data identifying the first cart from the one or more client devices.

8. The computer-implemented method of claim 1, wherein instructing the picker to pick the first item having the first SKU identifier includes:
   instructing, by the one or more processors, the picker to pick a pick quantity of the first item, and
   determining, by the one or more processors, the pick quantity based on orders assigned to the first cart.

9. The computer-implemented method of claim 8, wherein:
   the computer-implemented method includes:
      receiving, by the one or more processors, a first user input requesting to split the pick quantity of the first item of the first item into multiple picks; and receiving, by the one or more processors, a second user input indicating a second quantity of the first item having the first SKU identifier for at least one of the multiple picks; and
receiving the one or more confirmation inputs includes receiving a confirmation input after each of the multiple picks.

10. The computer-implemented method of claim 8, wherein:
determining a first quantity of the first item having the first SKU identifier in the first order;
determining a second order of the set of orders that includes the first SKU identifier;
determining a second quantity of the first item having the first SKU identifier in the second order; and
determining the pick quantity of the first item having the first SKU identifier by summing the first quantity and the second quantity.

11. The computer-implemented method of claim 1, further comprising:
receiving, by the one or more processors, an input indicating that the first cart is full and, in response, transporting, by an automated guided vehicle, the first cart to a finalization station, the end point being at the finalization station.

12. The computer-implemented method of claim 1, further comprising:
determining, by the one or more processors, that the first cart is at a finalization station, the end point being at the finalization station;
receiving, by the one or more processors, item scan data, the item scan data identifying the first SKU identifier of the first item; and
determining, by the one or more processors, the first order including the first SKU identifier based on the item scan data, the first cart having items with the first SKU identifier for multiple orders.

13. The computer-implemented method of claim 12, further comprising:
in response to determining the first order based on the item scan data, printing, by the one or more processors, a carton shipping label for a carton into which the first item for the first order is placed.

14. The computer-implemented method of claim 1, further comprising:
identifying, by the one or more processors, a second cart for batch picking; and
assigning, by the one or more processors, a second location in the pick-to-cart area to a second task queue of the second cart based on the second cart being located nearer to the second location in the pick-to-cart area than the first cart.

15. The computer-implemented method of claim 1, further comprising:
assigning, by the one or more processors, a second location in the pick-to-cart area to the task queue of the first cart; and
in response to two locations being assigned to the first cart, instructing, by the one or more processors, an automated guided vehicle to transport the first cart to the first location in the pick-to-cart area.

16. A system comprising:
a processor, and
a non-transitory computer-readable memory storing instructions that, when executed by the processor, cause the system to:
receive data describing a set of items having one or more stock keeping unit (SKU) identifiers associated therewith;
sort a set of orders into a subset of orders based on each order of the subset of orders consisting of a single variety of SKU identifier;
identify a first cart for batch picking;
assign a first location in a pick-to-cart area to a task queue of the first cart based on a first item having a first SKU identifier being located at the first location and a first order of the subset of orders including-only the first SKU identifier;
navigate the first cart to the first location in the pick-to-cart area;
instruct a picker to pick the first item having the first SKU identifier at the first location;
receive one or more confirmation inputs indicating completion of a pick of the first item having the first SKU identifier to the first cart; and
navigate the first cart to an end point.

17. A computer-implemented method comprising:
receiving, by one or more processors, a set of orders into a picking system, the set of orders including one or more items having one or more stock keeping unit (SKU) identifiers associated therewith, the picking system being communicatively coupled with one or more client devices;
sorting, by the one or more processors, the set of orders into a subset of orders based on each order of the subset of orders consisting of a single variety of SKU identifier;
identifying, by the one or more processors, a first cart for batch picking;
assigning, by the one or more processors, a first location in a pick-to-cart area to a task queue of the first cart based on a first item having a first SKU identifier being located at the first location and a first order of the subset of orders including solely the first SKU identifier;
navigating, by the one or more processors, the first cart to the first location in the pick-to-cart area;
instructing, by the one or more processors and using the one or more client devices, a picker to pick a quantity of the first item having the first SKU identifier at the first location, the quantity being based on one or more orders assigned to the first cart;
receiving, by the one or more processors and the one or more client devices, one or more confirmation inputs indicating completion of a pick of the quantity of the first item having the first SKU identifier to the first cart; and
navigating, by the one or more processors, the first cart to an end point.

18. The computer-implemented method of claim 17, further comprising:
receiving, by the one or more processors, after dispatching the first cart, order data representing a second order, the second order including a second SKU identifier;
determining, by the one or more processors, a second location at which a second item having the second SKU identifier is located;
determining, by the one or more processors, that the second location is located after the first location on a path of the first cart; and
in response to the second location being located after the first location on the path of the first cart, assigning the second location to the task queue of the first cart and transmitting a second pick instruction to the one or more client devices, the second pick instruction indicating a second quantity of the second item having the second SKU identifier.

19. The computer-implemented method of claim 17, wherein receiving the set of orders into the picking system includes:
- receiving, by the one or more processors, first order data representing an initial set of orders, the first order data indicating SKU identifiers included in the set of orders; and
- sorting, by the one or more processors, the initial set of orders into the set of orders based on the SKU identifier in each order.

20. The computer-implemented method of claim 17, further comprising:
- receiving, by the one or more processors, scan data from the one or more client devices, the first cart being identified using the scan data;
- determining, by the one or more processors, a current location of the first cart in a fulfillment center; and
- dispatching, by the one or more processors, the first cart from the current location.

\* \* \* \* \*